United States Patent
Kuroda et al.

(10) Patent No.: US 7,894,083 B2
(45) Date of Patent: Feb. 22, 2011

(54) PRINT CONTROL WITH INTERFACES PROVIDED IN CORRESPONDENCE WITH PRINTING METHODS

(75) Inventors: Shigeki Kuroda, Kanagawa (JP); Hidekazu Morooka, Kanagawa (JP); Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1195 days.

(21) Appl. No.: 10/241,682

(22) Filed: Sep. 12, 2002

(65) Prior Publication Data

US 2003/0053106 A1    Mar. 20, 2003

(30) Foreign Application Priority Data

Sep. 14, 2001  (JP)  ............... 2001-279598
Sep. 14, 2001  (JP)  ............... 2001-279599

(51) Int. Cl.
  *G06F 3/12*  (2006.01)
  *G06K 15/00*  (2006.01)
(52) U.S. Cl. ............ 358/1.13; 358/1.14; 358/1.15
(58) Field of Classification Search ........... 358/1.15, 358/1.13, 1.12; 715/277
  See application file for complete search history.

(56) References Cited

U.S. PATENT DOCUMENTS

| | | | |
|---|---|---|---|
| 5,287,194 A * | 2/1994 | Lobiondo | 358/296 |
| 6,088,120 A * | 7/2000 | Shibusawa et al. | 358/1.15 |
| 6,266,150 B1 | 7/2001 | Brossman et al. | 358/1.15 |
| 6,348,971 B2 * | 2/2002 | Owa et al. | 358/1.15 |
| 6,606,165 B1 * | 8/2003 | Barry et al. | 358/1.9 |
| 6,762,852 B1 * | 7/2004 | Fischer | 358/1.15 |
| 6,798,530 B1 * | 9/2004 | Buckley et al. | 358/1.13 |
| 6,909,520 B2 * | 6/2005 | Ogino | 358/1.15 |
| 7,061,635 B1 * | 6/2006 | Wanda et al. | 358/1.15 |
| 7,173,718 B2 | 2/2007 | Iwata et al. | 358/1.13 |
| 2002/0030743 A1 * | 3/2002 | Inui | 348/195 |
| 2002/0101604 A1 * | 8/2002 | Mima et al. | 358/1.15 |
| 2002/0105671 A1 * | 8/2002 | Sugahara | 358/1.15 |
| 2002/0163666 A1 * | 11/2002 | Iwata et al. | 358/1.15 |
| 2002/0181013 A1 * | 12/2002 | Dunlap | 358/1.15 |
| 2003/0014446 A1 * | 1/2003 | Simpson et al. | 707/527 |
| 2003/0053082 A1 | 3/2003 | Tomito et al. | 358/1.2 |
| 2003/0053105 A1 | 3/2003 | Morooka et al. | 358/1.13 |

FOREIGN PATENT DOCUMENTS

| | | |
|---|---|---|
| EP | 1 083 478 A2 | 3/2001 |
| JP | S62-234438 A | 10/1987 |
| JP | H01-265744 A | 10/1989 |
| JP | 08016344 A * | 1/1996 |
| JP | 09-319533 | 12/1997 |
| JP | 11-143661 A | 5/1999 |
| JP | H11-237964 A | 8/1999 |
| JP | 2000-163235 A | 6/2000 |
| JP | 2001-290625 | 10/2001 |

* cited by examiner

*Primary Examiner*—Benny Q Tieu
*Assistant Examiner*—Vincent Rudolph
(74) *Attorney, Agent, or Firm*—Fitzpatrick, Cella, Harper & Scinto

(57) ABSTRACT

Display control is made so as to obtain an optimum setting picture plane in accordance with a change in designation of an outputting method of a distribution printing, a multiple-address printing, an automatic substitute printing, or the like without allowing the user to be conscious thereof.

3 Claims, 21 Drawing Sheets

FIG. 10

| CONSTRUCTION OF MEMBER PRINTERS | ITEMS WHICH CAN BE SET |
|---|---|
| INCLUDING FUNCTION UNCONTROLLABLE DRIVERS | COMMON SET ITEMS |
| ONLY FUNCTION CONTROLLABLE DRIVERS | COMMON SET ITEMS + EXPANSION SET ITEMS |

FIG. 12

| FUNCTION | MEMBER PRINTER DRIVER B | MEMBER PRINTER DRIVER C | MEMBER PRINTER DRIVER D | GROUP PRINTER DRIVER A |
|---|---|---|---|---|
| BOOK-BINDING PRINTING FUNCTION | PRESENT | ABSENT | PRESENT | ABSENT |
| STAPLING FUNCTION | PRESENT | PRESENT | PRESENT | PRESENT |
| PUNCHING FUNCTION | ABSENT | ABSENT | ABSENT | ABSENT |

FIG. 11

| | SET ITEMS |
|---|---|
| COMMON SET ITEMS | LOGIC PAPER SIZE<br>OUTPUT PAPER SIZE<br>USER DEFINED PAPER<br>PRINTING DIRECTION<br>BLANK<br>MAGNIFICATION<br>THE NUMBER OF COPIES<br>COPY BY COPY (GROUP, COLLATE)<br>SORT (NON COLLATE)<br>PAGE LAYOUT<br>ARRANGING ORDER<br>DUPLEX/SIMPLEX<br>RESOLUTION<br>GRAY SCALE |
| EXPANSION SET ITEMS | ROTATION<br>WATERMARK<br>PAGE OPTION<br>BINDING DIRECTION<br>BINDING MARGIN<br>STAPLE<br>STAPLING POSITION<br>SADDLE (BOOK-BINDING PRINT)<br>THE UPPER LIMIT NUMBER OF SADDLE COPIES |
| | METHOD OF BOOK-BINDING PRINT<br>OPENING DIRECTION<br>BOOK-BINDING MARGIN<br>LOWER LIMIT VALUE OF BOOK-BINDING MARGIN |
| | PUNCH<br>Z-FOLDING<br>4-FACE POSTCARD<br>PAPER MIXTURE<br>INSERTER<br>PAPER FEEDING METHOD<br>PAPER FEEDING UNIT |

FIG. 22

| FAVORITE (F): | | | | |
|---|---|---|---|---|
| OUTPUTTING METHOD (O): | MULTIPLE ADDRESS | | | |

OUTPUT DESTINATION DEVICE (T):

| NAME | STATUS | INSTALLING LOCATION | DEVICE INFORMATION |
|---|---|---|---|
| ☒ PRINTER A | ERROR | 7F | A4, A3/DUPLEX/STAPLE/ |
| ☒ PRINTER B | DURING SLEEP | 6F | A4, A3, B5/DUPLEX |
| ☒ PRINTER C | DURING SLEEP | 5F | A4 |

PROPERTY OF DRIVER (T) ...

| CONFIRM SETTING (V) | ADDITION/DELETION OF DEVICE (D) | UPDATE TO LATEST INFORMATION (E) |
|---|---|---|

RETURN TO DEFAULT (R)

| OK | CANCEL | APPLY (A) | HELP |
|---|---|---|---|

PRINT CONTROL WITH INTERFACES PROVIDED IN CORRESPONDENCE WITH PRINTING METHODS

BACKGROUND OF THE INVENTION

1. Field of the Invention

The invention relates to a print control method and a print control apparatus for executing a printing process in correspondence to a draw command from an application and also relates to a print control program for performing a print data process which can be executed by a computer and a memory medium in which a computer-readable program has been stored.

2. Related Background Art

In recent years, it has become more and more common to use network apparatuses, that is, to use a network to which a number of personal computers (hereinafter, abbreviated to "PCs") and printers are connected. In such a network environment, in order to shorten printing time for a document having a given number of pages or that is to be printed as a given number of copies, a system (distribution printing system) such that a print job is once spooled, distributed, and outputted page by page or copy by copy to a plurality of printers has been known.

Further, in such a network environment, in order to reduce costs and time in printing a document in which color pages and monochromatic pages exist mixedly, a system (color/monochromatic distribution printing system) such that the color pages are distributed and outputted to a color printer and the monochromatic pages are distributed and outputted to a monochromatic printer has been known.

Moreover, in such a network environment, a system (multiple address print system) such that one document is simultaneously transmitted to a plurality of printers and printed by one print instruction has been known.

In addition, in such a network environment, there ahs also been known a system (error substitute print system) such that if an error occurs in the printer to which the document has been transmitted for printing, the job is automatically switched to another printer and printed.

In a general printer driver, fundamental set information (for example, the number of print copies and permission/inhibition information of a duplex print) which is necessary for an ordinary printing process has been stored in an area called a common area (Public DEVMODE) of driver set information. It has been known that in the information set in such an area, set items can be read out and written even using a printer from a different vendor.

Certain functions which are peculiar to the printer, for example, a stapling function, a punching function, and a book-binding printing function, have been stored in an expansion area (expanded DEVMODE) of the driver set information. In the set information in such an area, the format differs depending on the printer vendor.

A virtual printer driver for issuing print instructions in a lump to a plurality of printer devices as described above has also been known.

However, in a user interface of the conventional virtual printer driver, the various available outputting methods and the printer driver serving as a target for a selected outputting method (that is, the driver called upon to execute the job using the selected method) are not made to correspond to each other. Each time the user changes outputting method, it is necessary to reconstruct the target printer driver (corresponding to a corresponding printer device), or each time the user reconstructs the target printer driver, it is necessary to change and reset the print setting.

Since it is troublesome to reset the print setting each time the outputting method is changed, there is also a method of setting items in the print setting to be fixed in their contents. However, according to such a method, the contents of print set items to be set in a lump are limited to a small range of possible settings (for example, paper size is set to only A4 or the like) which is suitable for any printer. Consequently, this approach is not one that permits the full range of functions/abilities of each printer to be sufficiently utilized.

In the distribution printing, color/monochromatic distribution printing, multiple address print, substitute print, and the like methods described above, it is presumed that the combination of optimum target printers is naturally different, depending on the outputting method. It is very troublesome and difficult for the user to memorize all the various combinations of printers for the different outputting methods.

SUMMARY OF THE INVENTION

The invention is made in consideration of the above problems, and it is an object of the invention to provide a mechanism such that the user can easily perform print setting without having to be aware of matching performance of the print setting which is changed in accordance with a change in outputting method. To accomplish the above object, according to the invention, there is provided a mechanism to realize a print control method by a virtual printer which can control a plurality of member printers, comprising: a switching step of switching an outputting method in accordance with an instructed one of a plurality of outputting methods which can be controlled by the virtual printer; and a control step of controlling so as to switch a display of a user interface for setting the outputting method in accordance with a kind of outputting method switched by the switching step. For example, when a printer driver is constructed every outputting method such as distribution printing, multiple address print, automatic substitute print, or the like, a reconstruction of a combination of the printer drivers can be easily realized.

BRIEF DESCRIPTION OF THE DRAWINGS

FIG. 10 is a table showing a correspondence between constructions of member printer drivers and items which can be set;

FIG. 11 is a table showing a correspondence among common set items, expansion set items, and set items;

FIG. 12 is a table for explaining a mechanism of a conflict process;

FIG. 22 is a diagram showing an example of a display state of the UI at the time when a multiple address print has been designated as an outputting method;

DETAILED DESCRIPTION OF THE PREFERRED EMBODIMENTS

First Embodiment

A preferred embodiment to which the invention is applied will be described hereinbelow.

Figure 1:
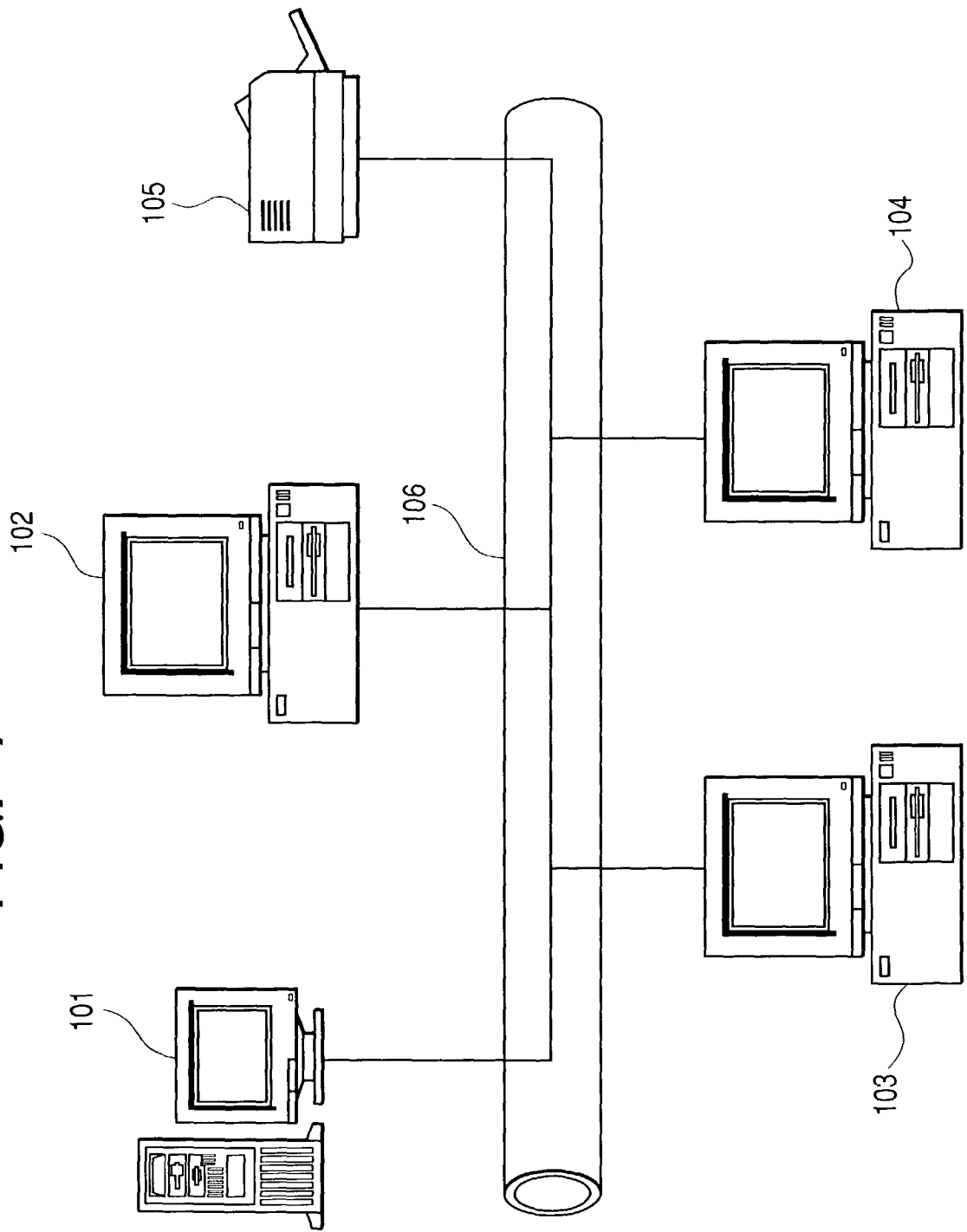
FIG. 1 is a block diagram for explaining a construction of an information processing system to which the invention can be applied.

FIG. 1 is a block diagram for explaining the construction of an information processing system to which the invention can be applied. It is presumed that in the present system, one or a plurality of client computers are connected.

In FIG. 1, reference numerals 102, 103, and 104 denote information processing apparatuses serving as client computers (clients). These client computers are connected to a network 106 by a network cable such as Ethernet (registered trademark) or the like and can execute various programs such as an application program and the like. A printer driver having a function for converting print data into a printer language corresponding to a printer has been installed in each information processing apparatus. It is assumed that the printer driver supports a plurality of printer drivers.

Reference numeral 101 denotes an information processing apparatus serving as a server (hereinafter, referred to as a print server) in the embodiment. The print server 101 is connected to the network 106 by a network cable, accumulates files which are used by the network, and monitors use status of the network 106. The print server 101 manages a plurality of printers connected to the network 106.

The clients 102 to 104 and the print server 101 are general information processing apparatuses. Print control programs each for making different control have been stored in the clients and the print server so that they can be executed.

The print server 101 is a general information processing apparatus and can also have the same functions as the clients 102 to 104 as described above.

The print server 101 in the embodiment further has a function such that print jobs including print data whose print request has been issued from the client computers 102, 103, and 104 are stored, and the print data is printed, or only job information including no print data is received from the client computers 102, 103, and 104, printing order of the client computers 102, 103, and 104 is managed, and the client whose printing job is next in order is notified of permission of transmission of the print job including the print data, or various information such as status and print job of a network printer 105 is obtained and communicated to the client computers 102, 103, and 104, respectively.

Reference numeral 105 denotes the network printer serving as a print control apparatus which is connected to the network 106 via a network interface (not shown). The network printer 105 analyzes the print job including the print data which is transmitted from the client computer, converts it into a dot image page by page, and prints the print data of each page.

Figure 2:
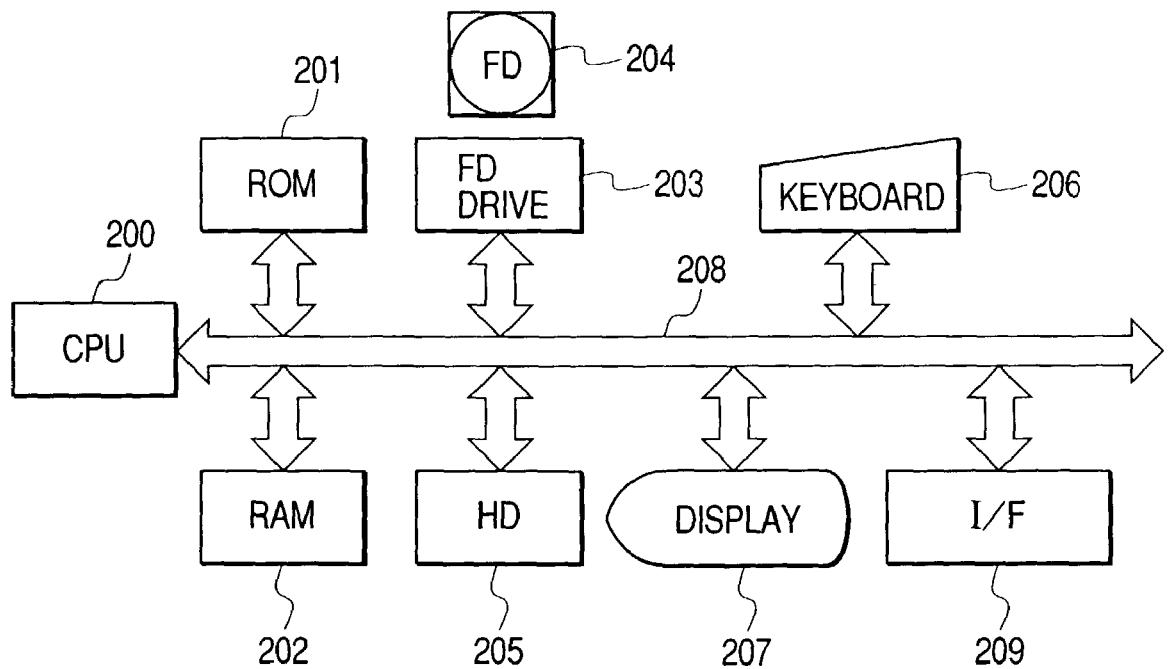
FIG. 2 is a block diagram for explaining a construction of an information processing apparatus of the invention.

FIG. 2 is a block diagram for explaining a construction of the information processing apparatus of the invention. Each of the client computers 102, 103, and 104 as information processing apparatuses also has the same construction as that shown in the diagram. Further, the server 101 also has a hardware construction which is similar or substantially equivalent to that shown in the diagram. Therefore, an explanation will be made on the assumption that FIG. 2 is a block diagram for explaining the construction of the clients and server.

In FIG. 2, reference numeral 200 denotes a CPU as control means of the information processing apparatus. The CPU 200 performs control in a manner such that an application program, a printer driver program, an OS, a network printer control program of the invention, or the like which has been stored in a hard disk (HD) 205 is executed and information, files, and the like which are necessary to execute the program are temporarily stored into a RAM 202.

Reference numeral 201 denotes a ROM as storing means. Programs such as a basic I/O program and the like and various data such as font data, data for template, and the like which are used for a document process are stored in the ROM 201. Reference numeral 202 denotes the RAM as temporary storing means. The RAM 202 functions as a main memory, a work area, or the like of the CPU 200.

Figure 5:
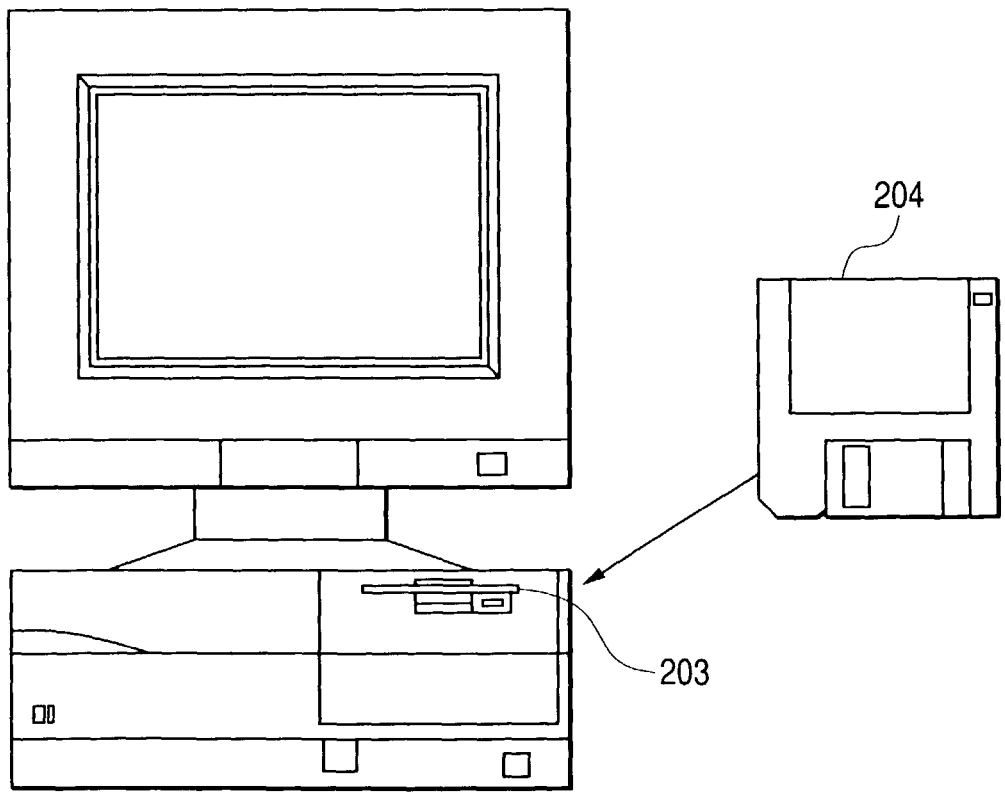
FIG. 5 is a diagram showing a relation of the FD 204 which is inserted into an FD drive 203 shown in FIG. 2.

Reference numeral 203 denotes a floppy (registered trademark) disk (FD) drive as memory medium reading means. A program or the like stored in an FD 204 as a memory medium can be loaded into the computer system via the FD drive 203 as shown in FIG. 5, which will be explained hereinlater. The memory medium is not limited to the FD but an arbitrary medium such as a CD-ROM, CD-R, CD-RW, PC card, DVD, IC memory card, MO, memory stick, or the like can be used.

Reference numeral 204 denotes the floppy disk (FD) as a memory medium in which a computer-readable program has been stored.

Reference numeral 205 denotes one of external storing means and indicates the hard disk (HD) which functions as a memory having a large capacity.

The application program, printer driver program, OS, network printer control program, related program, and the like have been stored on the HD 205. Further, a spooler as spooling means is held in the HD 205. The spooling means is a client spooler in case of the client and a server spooler in case of the print server. The job information received from the clients is stored in the print server and a table for making order control is also formed and stored in the external storing means.

Reference numeral 206 denotes a keyboard as instruction input means. The user instructs the client computer to input a command such as a control command or the like of a device by the keyboard 206, or the operator or the administrator instructs the print server to input the command such as a control command or the like of the device by the keyboard 206.

Reference numeral 207 denotes a display as display means for displaying the command inputted from the keyboard 206, a status of the printer, or the like.

Reference numeral 208 denotes a system bus for controlling a flow of data in the computer serving as a client or a print server.

Reference numeral 209 denotes an interface as input/output means. The information processing apparatus transmits and receives data to/from an external apparatus via the interface 209.

Figure 3:
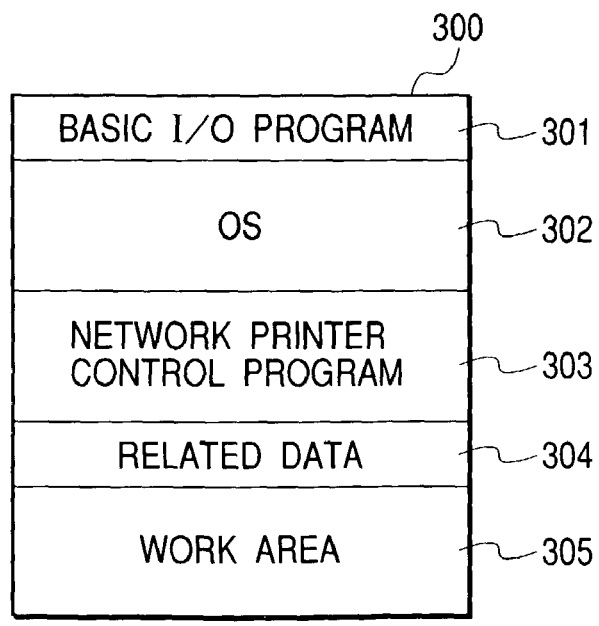
FIG. 3 shows an example of a memory map in an RAM 202 shown in FIG. 2.

FIG. 3 is a diagram showing an example of a memory map in the RAM 202 shown in FIG. 2. This diagram shows the memory map in a state where the network printer control program which is loaded from the FD 204 is loaded into the RAM 202 and can be executed.

In the embodiment, this diagram shows an example in which the network printer control program and related data are directly loaded from the FD 204 into the RAM 202 and executed. However, as another example, each time the network printer control program is made operative from the FD 204, such a program can be also loaded into the RAM 202 from the HD 205 on which the network printer control program has already been installed.

The medium for storing the network printer control program is not limited to the FD but a CD-ROM, a CD-R, a PC card, a DVD, or an IC memory card can be also used. Further, it is also possible to construct in a manner such that the network printer control program is stored in the ROM 201 and constructed as a part of the memory map and is directly executed by the CPU 200.

Software for realizing functions similar to those of the foregoing apparatuses can be also substituted for the hardware apparatuses.

The network printer control program is also simply referred to as a print control program. The print control program includes a program for making control so as to allow the client to instruct a change in print destination of the print job or a change in printing order. The print control program also includes a program for allowing the print server to make order control of the print jobs or make a notification of a print end, a request for changing the print destination, or the like of the print job. In the print control program of the invention for making such control, a module which is installed in the client and a module which is installed in the print server can be also separately provided. Alternatively, it is also possible to construct in a manner such that one print control program functions as a program for the clients or a program for the print server in accordance with an environment where it is executed. As a further alternative, it is also possible to construct in a manner such that both of a module having the function for the client and a module which functions as a program for the print server are installed into one computer, and they are simultaneously made operative or time-divisionally made operative in parallel in a pseudo-manner.

Reference numeral 301 denotes a basic I/O program. A program having an IPL (Initial Program Loading) function such that when a power source of the control apparatus is turned on, the OS is read out from the HD 205 and stored into the RAM 202 and the operation of the OS is started, or the like has been stored in an area of the basic I/O program 301.

Reference numeral 302 denotes an operating system (OS); 303 a network printer control program which is stored in an area held on the RAM 202; 304 related data which is stored in an area held on the RAM 202; and 305 a work area in which an area where the CPU 200 executes the print control program is held.

Figure 4:
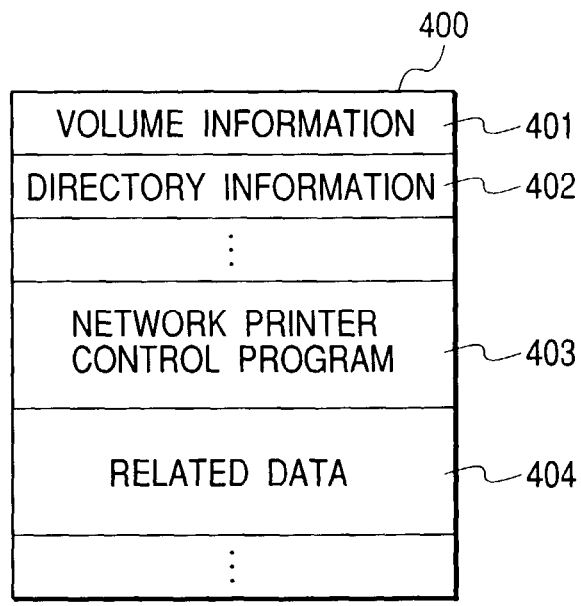
FIG. 4 shows an example of a memory map in an FD 204 shown in FIG. 2.

FIG. 4 is a diagram showing an example of the memory map in the FD 204 shown in FIG. 2.

In FIG. 4, reference numeral 400 denotes data contents in the FD 204; 401 volume information showing information of the data; 402 directory information; 403 a network printer control program as a print control program, which will be explained in the embodiment; and 404 its related data. The network printer control program 403 is a program based on flowcharts, which will be explained in the embodiment. In the embodiment, both of the client and the server have a similar construction.

FIG. 5 is a diagram showing a relation of the FD 204 which is inserted into the FD drive 203 shown in FIG. 2. In FIG. 5, component elements that are the same as those in FIG. 2 are designated by the same reference numerals.

In FIG. 5, the network printer control program and related data, which will be explained in the embodiment, have been stored in the FD 204.

A print job control system for executing a print process such as distribution, multiple address, or substitution mentioned above by using a plurality of printers in the embodiment will now be described.

In the embodiment, a printer for virtually binding a plurality of printers as one printer is called a "group printer", and the printers which are bound are called "member printers". A printer driver corresponding to the group printer is called a "group printer driver". A printer driver corresponding to the member printer is called a "member printer driver".

Figure 6:
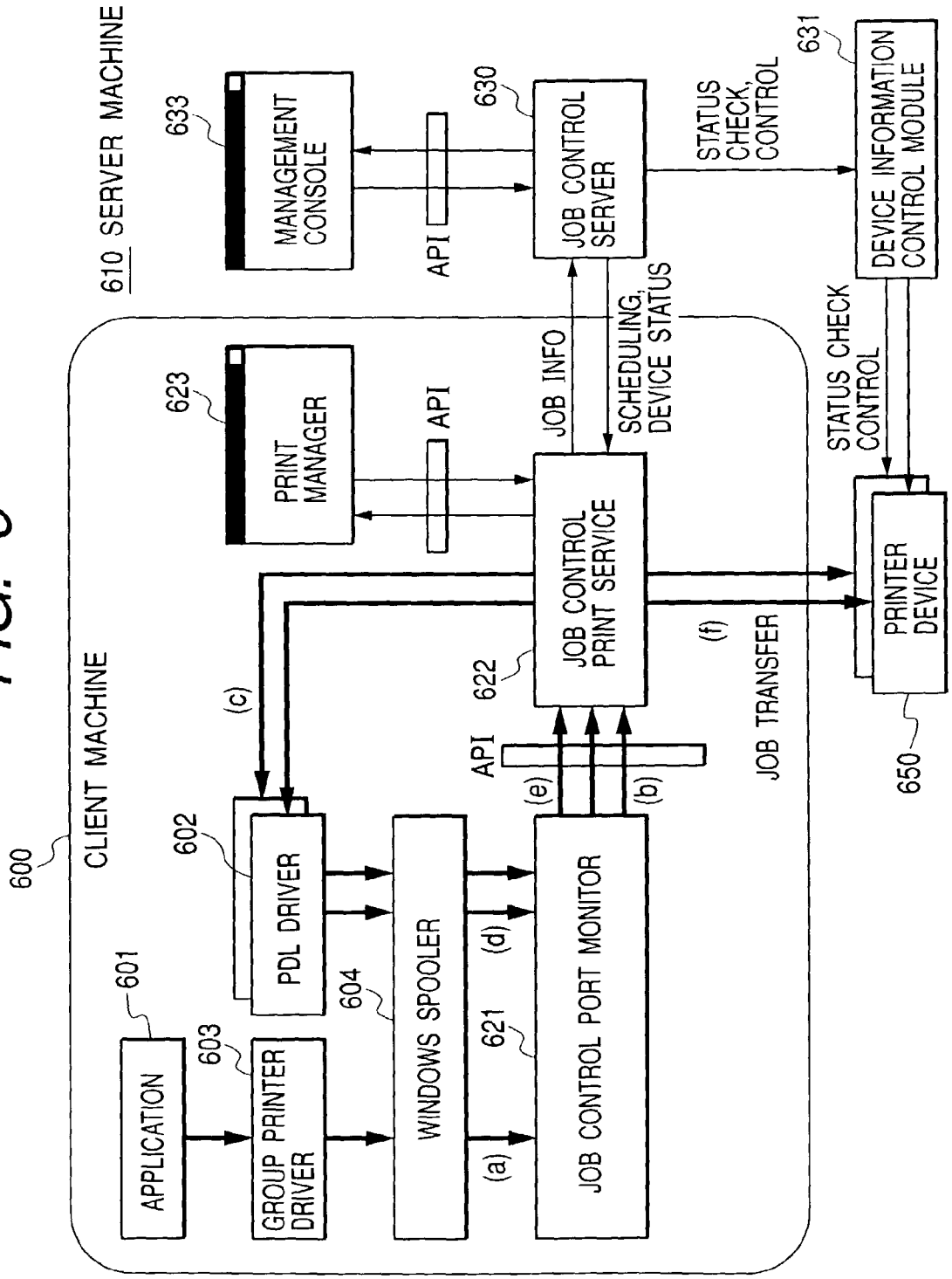
FIG. 6 is a block diagram for explaining a construction of print control modules of the information processing apparatus of the invention.

FIG. 6 is a diagram showing a manner by which a print job issued from a general application such as "Microsoft Word" or the like in the client server model of the present system is processed in the print job control system. In FIG. 6, reference numeral 600 denotes a client machine in which the client module of the print job control system operates.

Usually, when printing is instructed, the application program forms a series of draw commands and transfers them to a Windows spooler via the printer driver. The Windows spooler takes a procedure for transferring print job data to a port monitor selected by the user and transmitting it to a printer device.

In the embodiment, the user preliminarily designates a port monitor 621 for the print job control system (hereinafter, it is abbreviated to a job control port monitor in the embodiment) and instructs the print. An application program 601 forms a series of draw commands. A group printer driver 603 which has received the draw commands forms a general print file and transmits it as print job data to the job control port monitor 621 instead of a port monitor which transmits the print job data to the printer device. The job control port monitor 621 does not transmit the print job data to a printer device 650 but transmits it to a print service 622 for the print job control system (hereinafter, it is abbreviated to a job control print service in the embodiment). The job control print service 622 executes a print job control process, as will be explained hereinlater, to the print job data.

A print manager 623 for the print job control system (hereinafter, it is abbreviated to a job control print manager in the embodiment) is a program for allowing the user to examine in which status the print job is in the job control print service 622 or providing a user interface (UI) for operating the print job.

The job control print manager 623 transmits and receives information and instructions to/from the job control print service 622 via an interface (API) of software of the job control print service 622.

A server 630 for the print job control system (hereinafter, it is abbreviated to a job control server in the embodiment) concentratedly controls (schedules) timing when the job control print service 622 on each client 600 transmits the print job data to the printer device 650.

A management console 633 for the print job control system (hereinafter, it is abbreviated to a job control management console in the embodiment) can monitor the whole print job control system by transmitting and receiving information and instructions to/from the job control server 630 via the API for allowing software which the job control server 630 has to access.

The job control server 630 communicates with each printer device 650 by using a device information control module 631, obtains information regarding the print job and an operation mode in each printer, and executes the operation. The obtained information can be transferred to the job control print service 622 on the client 600 side.

A print from the group printer driver 603 in the embodiment will be described hereinbelow.

The group printer driver 603 converts the series of draw commands formed by the application program into the general print file as a file of an intermediate format which does not depend on the kind of printer device. A construction of the general print file will be explained hereinlater.

As mentioned above, this general print file is guided from a Windows spooler 604 via the job control port monitor 621 (a) to the job control print service 622 (b). In accordance with a kind of job control which is made to the print job, the job control print service 622 forms a draw command on the basis of the general print file (c). Subsequently, a PDL driver 602 converts the draw command into a PDL file which can be interpreted by the printer device 650. FIG. 6 shows the example in which job control for dividing the print job into two jobs is executed to such a print job by the job control print service 622. Examples in which two member jobs were formed are shown by two arrows (c). The PDL file formed by the PDL driver 602 is transmitted via the Windows spooler 604 and the job control port monitor 621 (d) and again transferred to the job control print service 622 (e). The job control print service 622 transmits the print job data of the PDL to the printer device 650 in accordance with an instruction of the job control server 630 (f).

In accordance with an instruction of a print instruction text in the general print file, the job control print service 622 logically divides one general print file into a plurality of print jobs, transmits them to different printer devices, or retransmits the print job data which was once transmitted to another printer device. Reference characters (c), (d), (e), and (f) in FIG. 6 show a path of the print job data in such a case.

In the case where application software forms a general print file and the application software directly inputs the general print file as a print job, a method of transferring information to the group printer driver 603 and process contents in the group printer driver 603 are different from those of a general application. As mentioned above, in the case of the general application, when drawing information is transferred to the group printer driver 603, the application calls a GDI function of Windows in a manner similar to that of the ordinary printer driver, and the group printer driver 603 forms a general print file in accordance with the GDI function. On the other hand, in the case of an application for directly forming a general print file, the application has already had the general print file and supplies it to the group printer driver 603. The group printer driver 603 rewrites a print instruction text in the general print file on the basis of a preset printing method as necessary and sends it to the Windows spooler 604.

Figure 8:
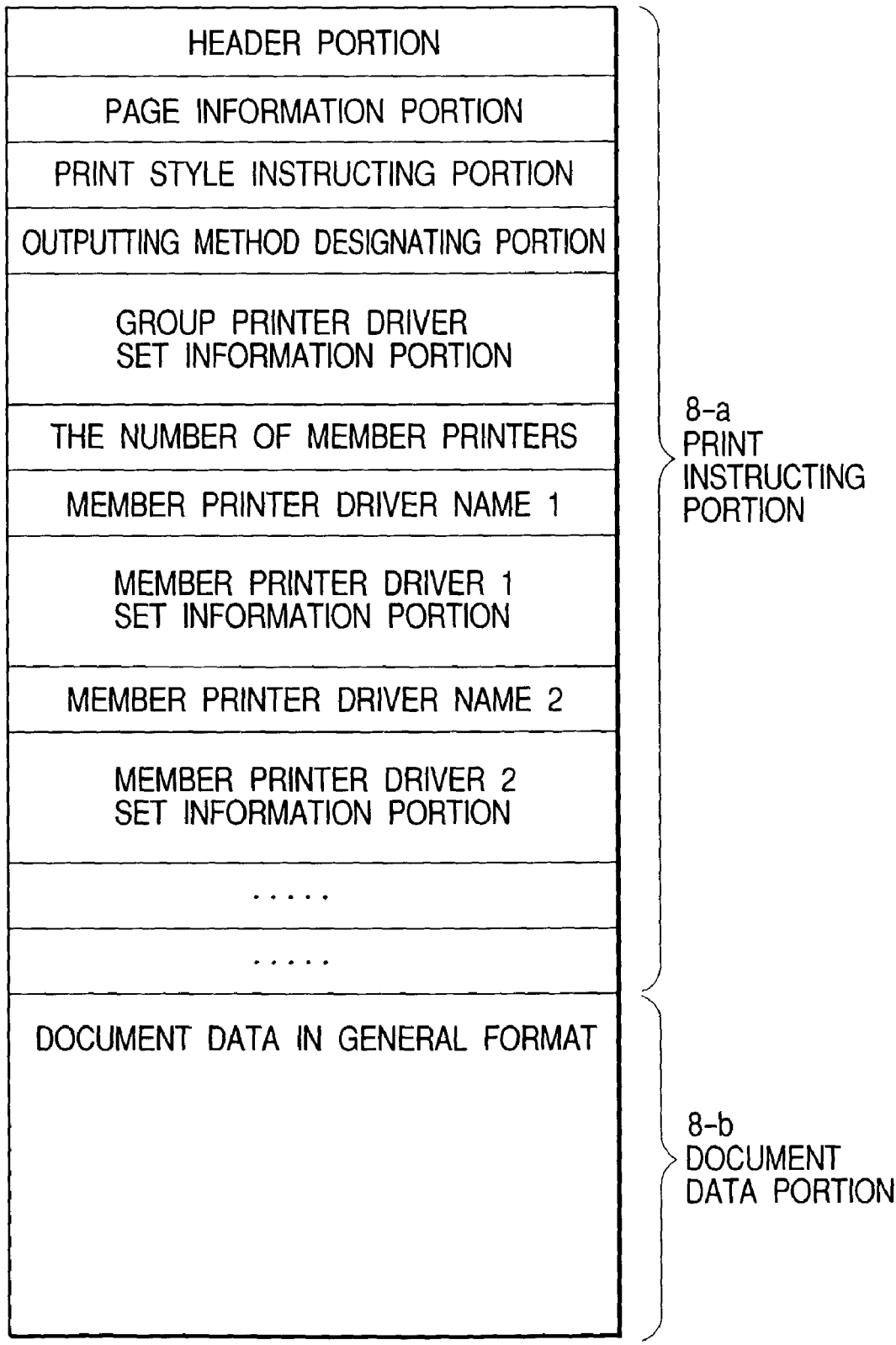
FIG. 8 is a diagram showing a structure of a general print file.

FIG. 8 is a diagram showing an example of a construction of a general print file.

The general print file which is used in the embodiment comprises a print instructing portion 8-a and a document data portion 8-b. The print instructing portion is a portion describing information of a document and a print instruction. The document data is data obtained by converting data of the document of the application into data in a general format and has a data format which does not depend on a printer language.

The print instructing portion is constructed by a header portion, a page information portion, a print style instructing portion, an outputting method designating portion, a group printer driver set information portion, the number of member printers, a member printer driver name, a member printer driver set information portion, and the like.

The header portion is a portion to store information such as version identification, file information, and the like of the file.

The page information portion is a portion to store information such as the number of pages of the document data in the document data portion 8-b, size of each page, and the like.

The print style instructing portion is a portion to store information regarding an output style, such as print page range, the number of print sheets, layout information (N-UP, book-binding print, etc.) of the document data, stapling instruction, punching instruction, and the like.

The outputting method designating portion is a portion to store information such as distribution printing, color/monochromatic distribution printing, substitute print, multiple address print, and the like as an outputting method.

The group printer driver set information portion is a portion to store set information of a UI of a group printer driver, which will be explained hereinlater.

The number of member printers is a portion to store the number of member printers to which the group printer driver has been made to correspond.

The member printer driver name is a portion to store a name of the printer driver of the member printer.

The member printer driver set information portion is a portion to store, for example, DEVMODE information as set information of a driver UI of the member printer.

Each of the member printer driver name and the member printer driver set information portion has storing areas of the number stored in the portion of the number of member printers mentioned above.

In the group printer driver 603 described in FIG. 6 mentioned above, when the general print file is formed, set contents on the group printer driver GUI are recorded into the print instructing portion 8-a. Further, the group printer driver 603 converts the data received by the GDI into the general data and records it as document data into the document data portion of the general print file.

The present file can be also replaced with a file in which the print instructing portion 8-a and the document data portion 8-b are different. In such a case, the print instructing portion exists as a print instruction text file, the document data portion exists as a document data file, and they can be also bound in one archive format and similarly handled like one file.

The print system which is provided by Windows, the relation of the print jobs in a print job control system, and an outline of processes in FIG. 7 will be described in further detail.

Figure 7:
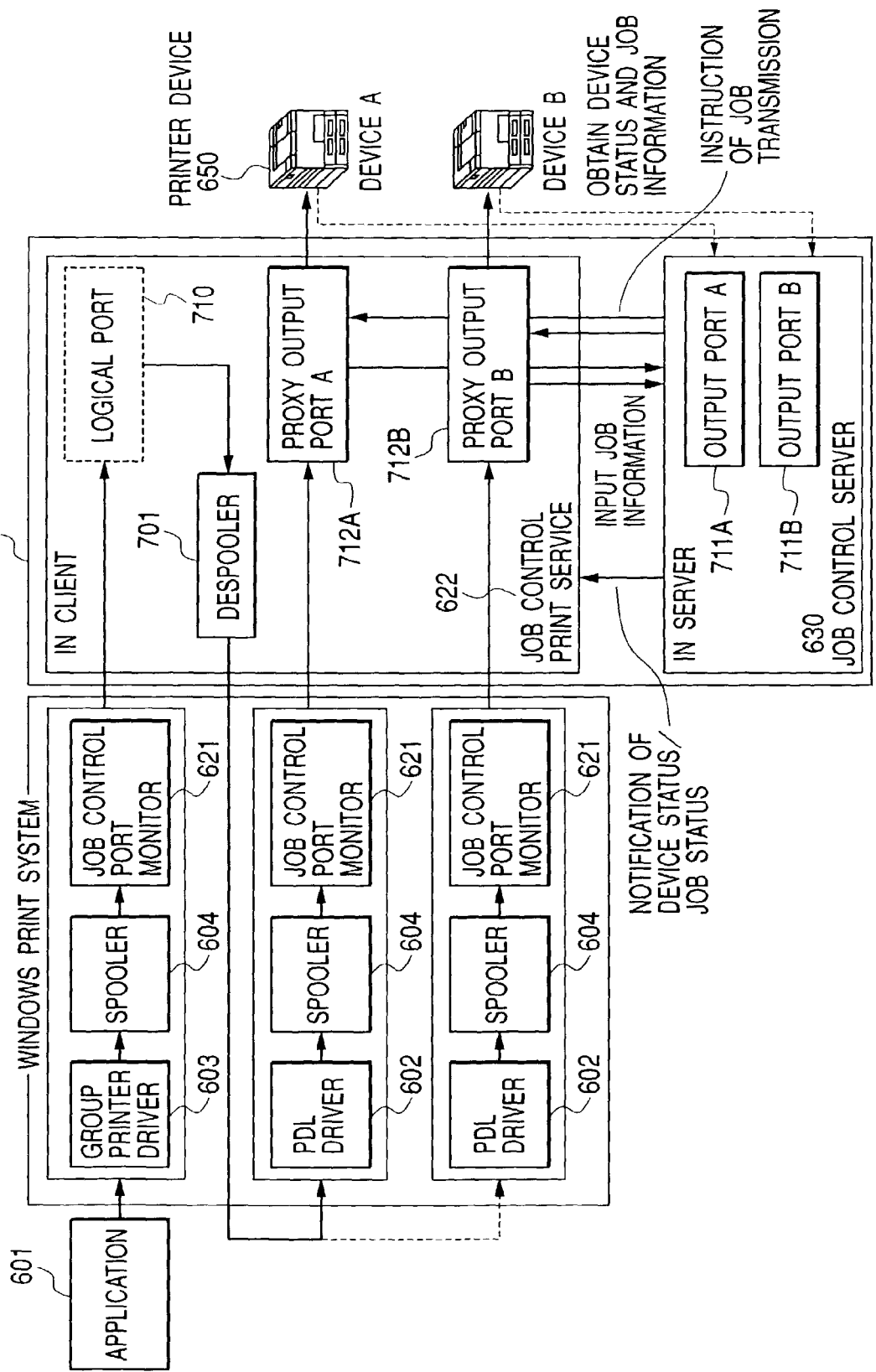
FIG. 7 shows an example of a data structure of job information which is managed by a print server.

In FIG. 7, a print job control system 700 shows a range of the print job control system over physical machines in which the control program for the server and the client operate. An output port 711 (711A, 711B) managed by the server is allowed to correspond to a proxy output port 712 (712A, 712B) of the job control print service 622 of the client and integratedly manages all proxy output ports on each client allowed to correspond to one port. In the embodiment, actual print job data is held in the proxy output port 712 of each client. The job control server 630 does not execute a transmitting process of the print job data itself but issues only a transmitting instruction of the print job to the job control print service 622. In accordance with this instruction, the job control print service 622 transmits the print job data to the printer device 650.

Subsequently, processes in the case where the print job control system 700 executes a print with an additional value such as substitute print, distribution printing, multiple address print, or the like will be described.

In the case where the print job control system 700 executes printing with an additional value such as substitute print, distribution printing, multiple address print, or the like, the user or the application 601 has to issue the print job to the printer to which the group printer driver 603 has been allocated. The job control print service 622 receives the job data processed by the group printer driver 603 as a general print file via the job control port monitor 621. The job control print service 622 receives this job and issues a job (member job) to another printer to which the PDL driver has been allocated via a despooler 701, thereby allowing the printer to print. At this time, the despooler 701 interprets the print instructing portion 8-a of the general print file described in FIG. 8 mentioned above, modifies the document data in the document data portion 8-b, converts it into the GDI of Windows, instructs each printer driver to print, and issues the print job. For example, if an instruction of 2-UP has been recorded in the print style instructing portion, the document data of two pages is reduced and arranged (reduction layout) onto one sheet of paper. In a case of distribution printing or multiple-address printing, the jobs are issued to a plurality of member printers described in the print instructing portion 8-a in accordance with those set contents. In a case of substitute printing, when substituting conditions are satisfied, member jobs are issued in accordance with the previous set contents in the case of automatic substitution and are issued in accordance with the operation of the user in the case of manual substitution.

When the job is issued to each member printer, the despooler 701 needs to form DEVMODE of each member printer as a print instruction corresponding to the member printer driver. However, this DEVMODE is formed by properly reflecting the contents disclosed in the print instructing portion 8-a to the DEVMODE of each member printer.

The job control print service 622 on the client side receives the PDL data of each member job which has been rendered by the PDL driver 602 via the job control port monitor 621, notifies the server side of information regarding the received job, and temporarily holds the job data into its own proxy output port 712. After that, the job control print service 622 receives a transmitting instruction from the job control server 630 and, subsequently, transmits it to the printer device 650.

An explanation will be made with respect to UI control of the printer driver for the print job control system for executing a printing process such as distribution, multiple address, or substitution by using a plurality of printers having printer drivers with memory areas such as common set area and expansion set area in the embodiment.

Figure 9:
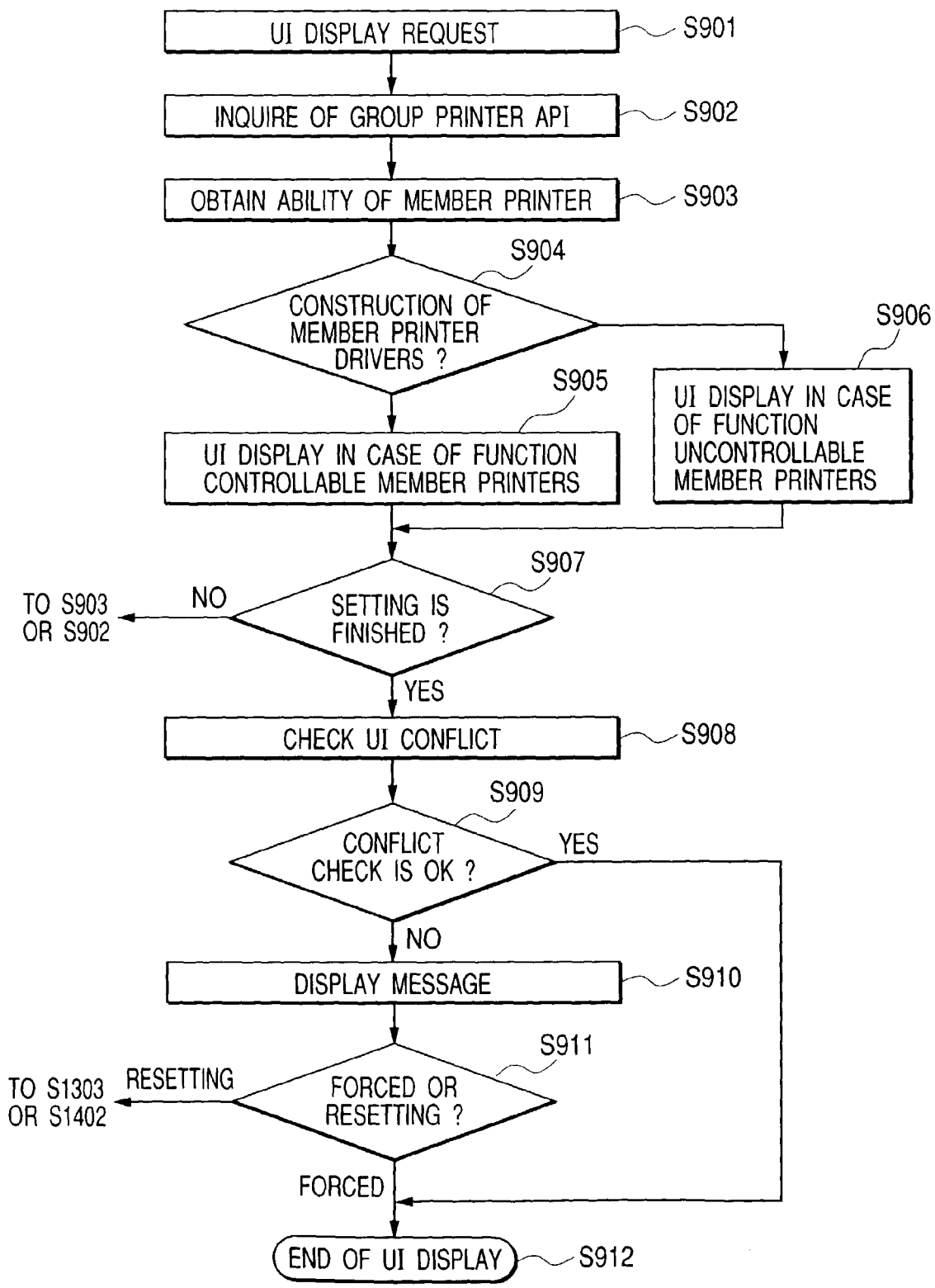
FIG. 9 is a control flowchart showing the operation of a group printer driver.

FIG. 9 is a flowchart showing a UI control flow of the group printer driver of the invention. It is assumed that a process in each step in the flowchart of FIG. 9 is realized by a method whereby the CPU (central processing unit) provided for the information processing apparatus described above reads out a control program stored in predetermined nonvolatile memory means such as ROM, FD, hard disk (HD), or the like and executes a process based on the read-out program. It is also assumed that this point is also similarly applied to a flowchart of each of FIGS. 13, 14, 15, 17, and 24, which will be explained hereinlater.

In step S901, a UI display request to the group printer driver is accepted from the application via the OS for the control program.

In step S902, in response to the UI display request in step S901, an identification ID of each member printer driver constructing the group printer driver is inquired by using a print job control system API, thereby obtaining the identification IDs of all of the member printer drivers constructing the group printer driver. A name of each member printer driver, or other information for identifying it, can be applied as an identification ID.

In step S903, the capability of the member printer driver is obtained from the identification ID of each member printer driver obtained in step S902 (a response is obtained by inquiring). This step corresponds to a process for reading out a result of discrimination about whether the member printer driver is a "function controllable driver" in which the driver function can be obtained up to the portion of the expansion area of the driver set information and the driver UI control can be made or another driver, that is, a "function uncontrollable driver" with respect to all of the member printer drivers constructing the group printer driver.

In step S904, a construction of the member printer driver is discriminated from information about whether the function is controllable or uncontrollable which was read out in step S903. As a result of the discrimination in step S904, if it is determined that the group printer driver is constructed by only the "function controllable drivers", the processing routine advances to step S905. If it is determined that the group printer driver is constructed by other drivers, the processing routine advances to step S906.

FIG. 10 is a table showing a correspondence between kinds of constructions of the member printer drivers constructing the group printer driver in the invention and items which can be set.

FIG. 11 is a table showing a correspondence among common set items, expansion set items, and set items.

In the present invention, the common set items are classified and specified as items existing in the foregoing common set area, and the expansion set items are classified and specified as items existing in the foregoing expansion set area. Although there is a case where the classification of the set items differs or a case where there is a change in items which can be set in dependence on a difference of the OS by which the print job control system operates, naturally, the UI control flow of the invention is effective.

Figure 13:
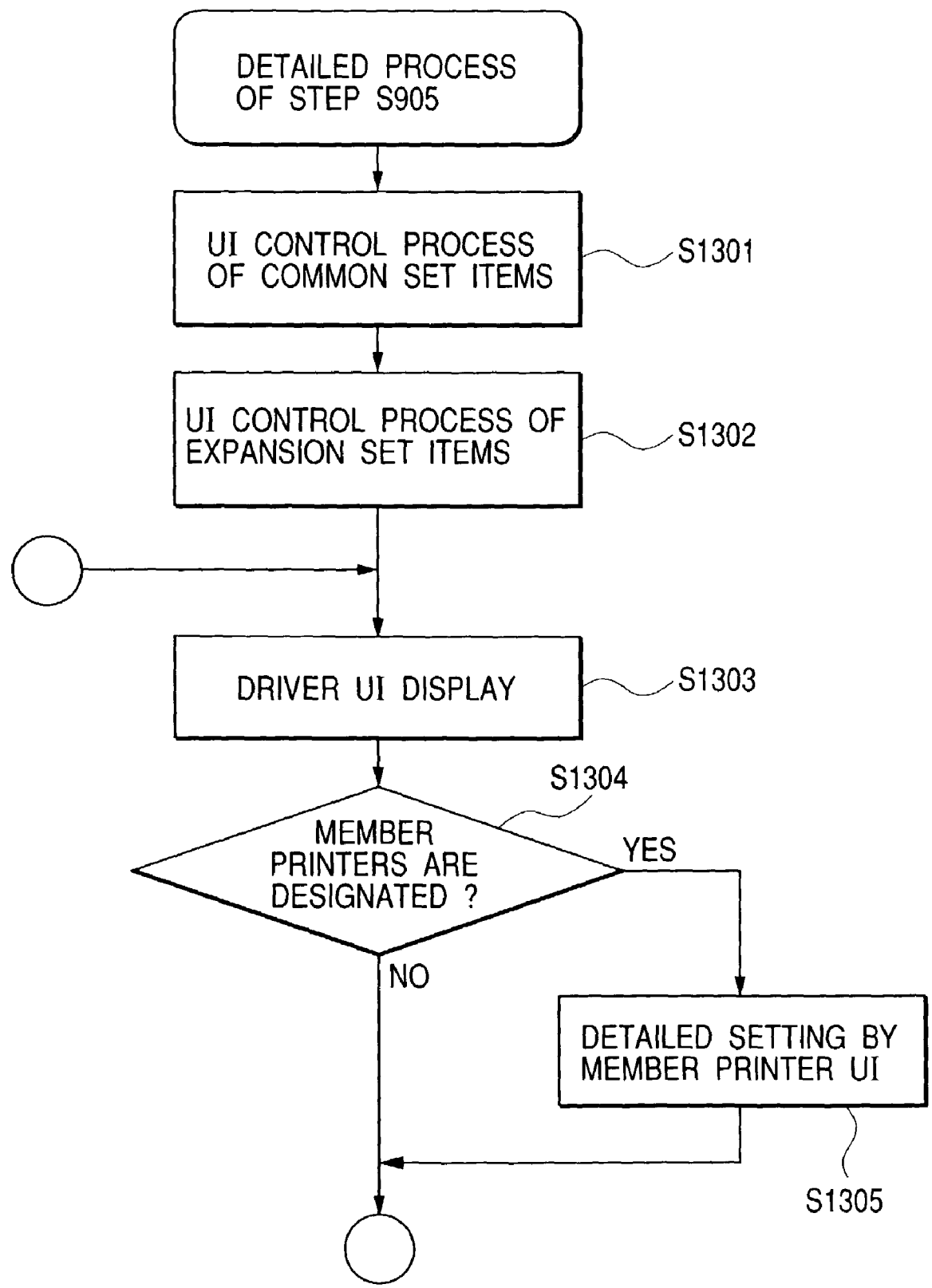
FIG. 13 is a control flowchart showing the operation of the group printer driver.

FIG. 13 is a flowchart showing the detailed process of step S905.

In step S1301, ability regarding each common set item of each member printer driver is inquired, a conflicting process of the function is executed, and items to be displayed by the group printer driver UI are selected on the basis of a result of the conflicting process.

The conflicting process of the function denotes a process such that the presence or absence of the function of each set item is discriminated with respect to each member printer driver serving as a target of the group printer driver, if there are functions (items) in all of the target member printer drivers every set item, the UI display control is made by the group printer driver UI so that the functions (items) are set to the items which can be set, and if there is at least one member printer driver without a function, such an item is set to the item which cannot be set.

The above UI control will now be described with respect to specific examples.

A printer driver A in FIG. 12 shows the group printer driver and printer drivers B, C, and D indicate the member printer drivers constructing the group printer driver. In the table, "present" and "absent" are obtained by this control program and indicate whether each member printer driver supports the book-binding printing function, stapling function, or punching function or not. Naturally, the above point is also similarly applied with respect to other predetermined functions (set items).

First, when attention is paid to the book-binding printing function, although the drivers B and D have the book-binding printing function, since the driver C does not have such a function, the item of "book-binding printing function" of the group printer driver A is "absent".

Similarly, as for the stapling function, since the function exists in all of the member printer drivers B, C, and D, the item of "stapling function" of the group printer driver A is "present". As for the punching function, since the function does not exist in all of the member printer drivers B, C, and D, the item of "punching function" of the group printer driver A is "absent".

In step S1302, the conflicting process of the functions shown in the above step is executed with respect to the expansion set items of each member printer driver.

In step S1303, the group printer driver UI display is performed on the basis of the results of the conflicting processes executed in steps S1301 and 1302, and the setting for each set item is performed in accordance with an operating instruction by the user.

With respect to the item without the function (for example, "book-binding printing function" in FIG. 12) as a result of the conflict, control is made so that it cannot be set on the UI, for example, the predetermined target item which is disabled to be set is gray-out displayed or is not displayed. With respect to the items having the functions, such display control is not performed.

Figure 16A:
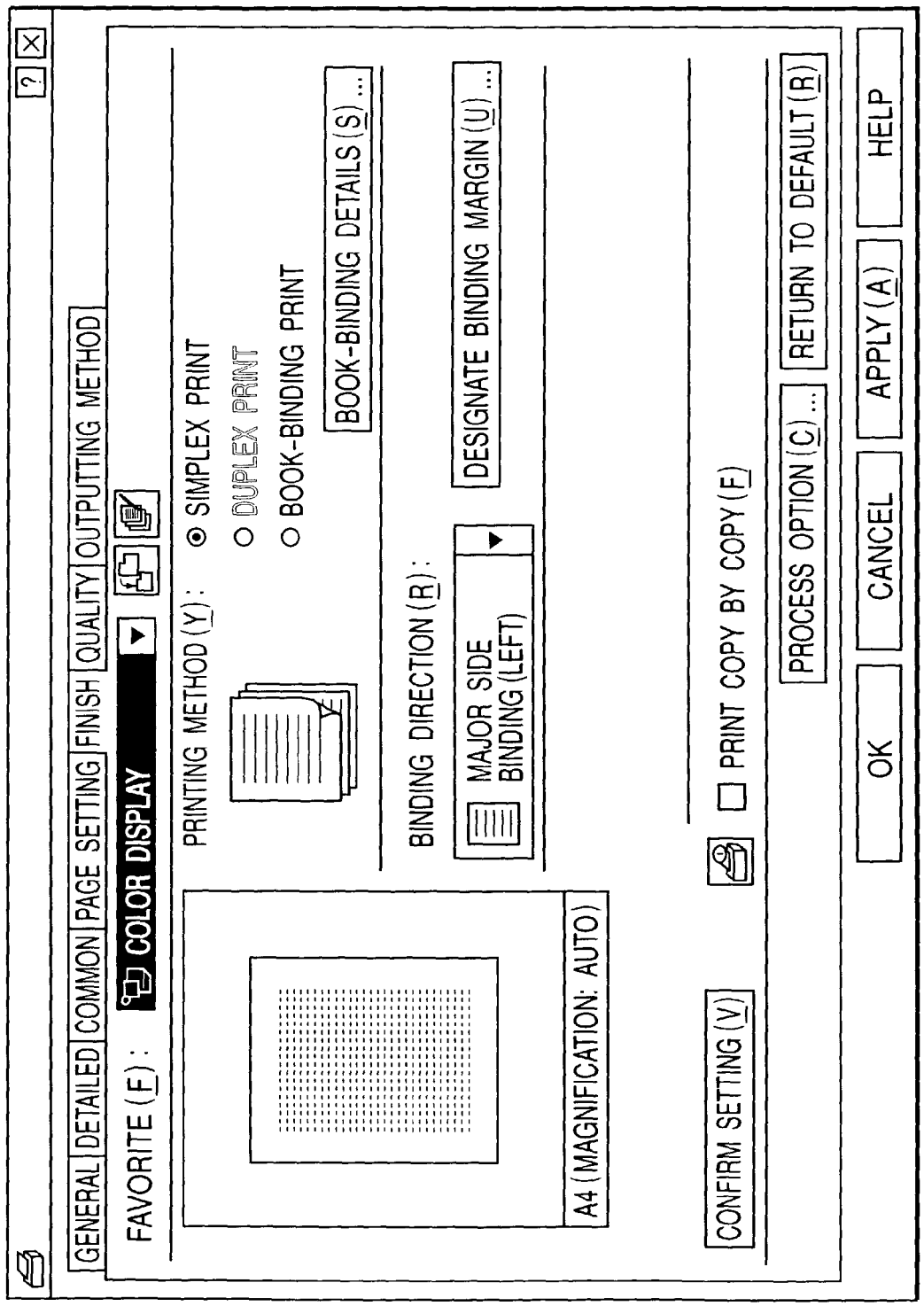
FIGS. 16A and 16B are diagrams each showing an example of a display state of a group printer driver UI subjected to display control.
Figure 16B:
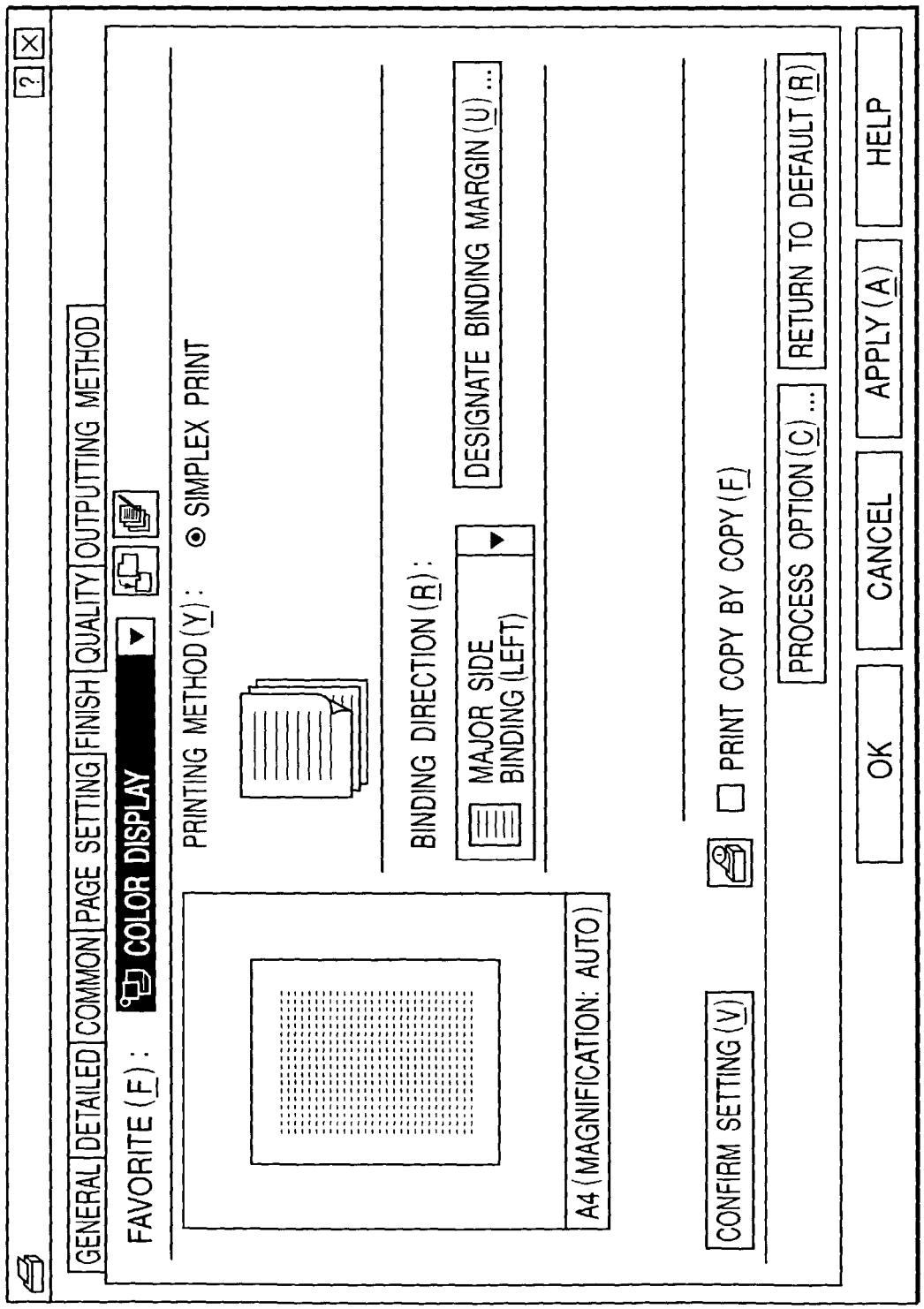

FIGS. 16A and 16B show specific examples of the gray-out control and non-display control of the user interface corresponding to step S1303. Dialog boxes of the duplex print and book-binding print of the set items are portions subjected to the UI control.

In step S1303, the UI control is made so that a combination which is impossible on the functions, such as a combination of the designation of, for example, the punching function and the stapling function at the time when "book-binding printing" is designated by the user cannot be set, thereby preventing the occurrence of a contradiction in the set items.

In step S1304, with respect to the items in which there is no set item on the group printer driver UI, that is, the items subjected to the UI display control of the non-display as described above as targets, the user interface of the member printer driver is individually displayed and in order to perform the detailed setting via the displayed individual user interface of the member printer driver, the member printer drivers as setting targets are designated from the group printer driver UI.

Figure 18:
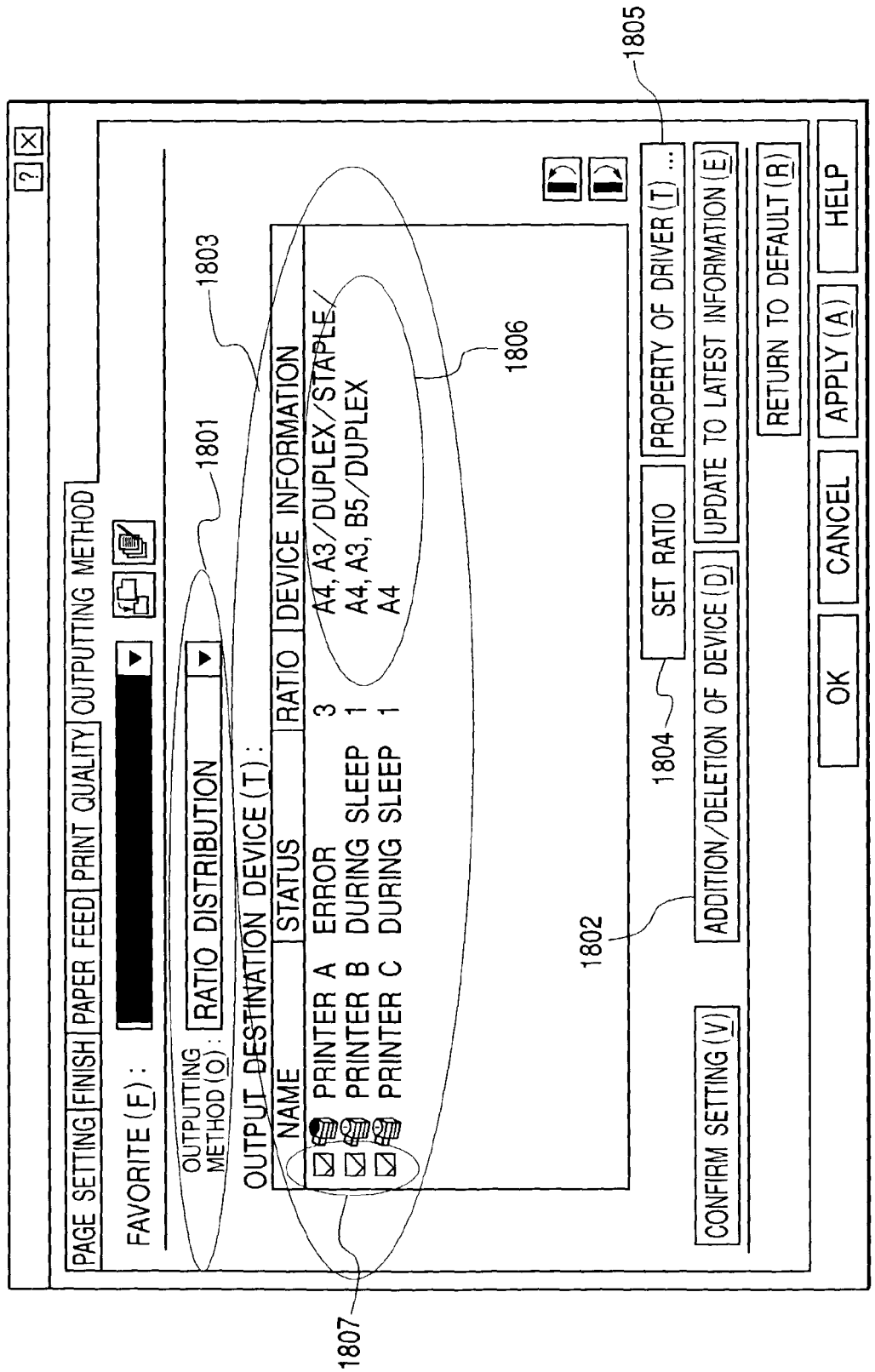
FIG. 18 is a diagram showing an example of a display state of the UI at the time when a ratio distribution printing has been designated as an outputting method.

The member printer drivers as designation targets are the member printer drivers constructing the group printer driver and correspond to, for example, the predetermined member printer drivers selected from Printer A, Printer B, Printer C, etc., in FIG. 18 in accordance with an input of a pointing device such as a mouse or the like.

In step S1305, the member printer driver UI designated in step S1304 is opened, and the detailed setting is performed.

In the case where the member printer driver UI is called via the group printer driver UI and displayed, if the predetermined items which can be set via the group printer driver can be also set via the member printer driver UI, the same function is set to both of them. Therefore, the setting process is executed twice. According to the invention, therefore, the following UI control is made and the displaying process of the member printer driver is executed.

(1) If the member printer driver is the "function controllable driver", with respect to the item which conflicts with the set items on the group printer driver UI, the UI control is made in a manner such that such an item cannot be set on the member printer driver UI by a method whereby such an item is gray-out displayed, is not displayed, or the like. It is also possible to construct the manner of control in a manner such that the UI is displayed so that a setting instruction can be performed and, when the setting is performed, a warning or the like is displayed, and the instructed setting is invalidated.

(2) If the member printer driver is the "function uncontrollable driver", with respect to the common set items, the UI is displayed in the setting state set via the group printer driver UI. After completion of the display control of the member printer driver UI, if the items which have been preset via the group printer driver UI are changed via the member printer driver UI, control is made in a manner such that when a process for closing the member printer driver UI is executed, the information of the set items set by the group printer driver is overwritten onto the common set items of the member printer driver, and the change in setting on the member printer driver UI is not permitted.

Display control such that when the overwriting process is executed, a warning showing that the setting change on the member printer driver UI is invalid is displayed is also presumed.

Since step S1305 corresponds to the discriminating process in step S904 showing that all of the target member printer drivers are the "function controllable drivers", the foregoing UI control (1) is executed.

Figure 14:
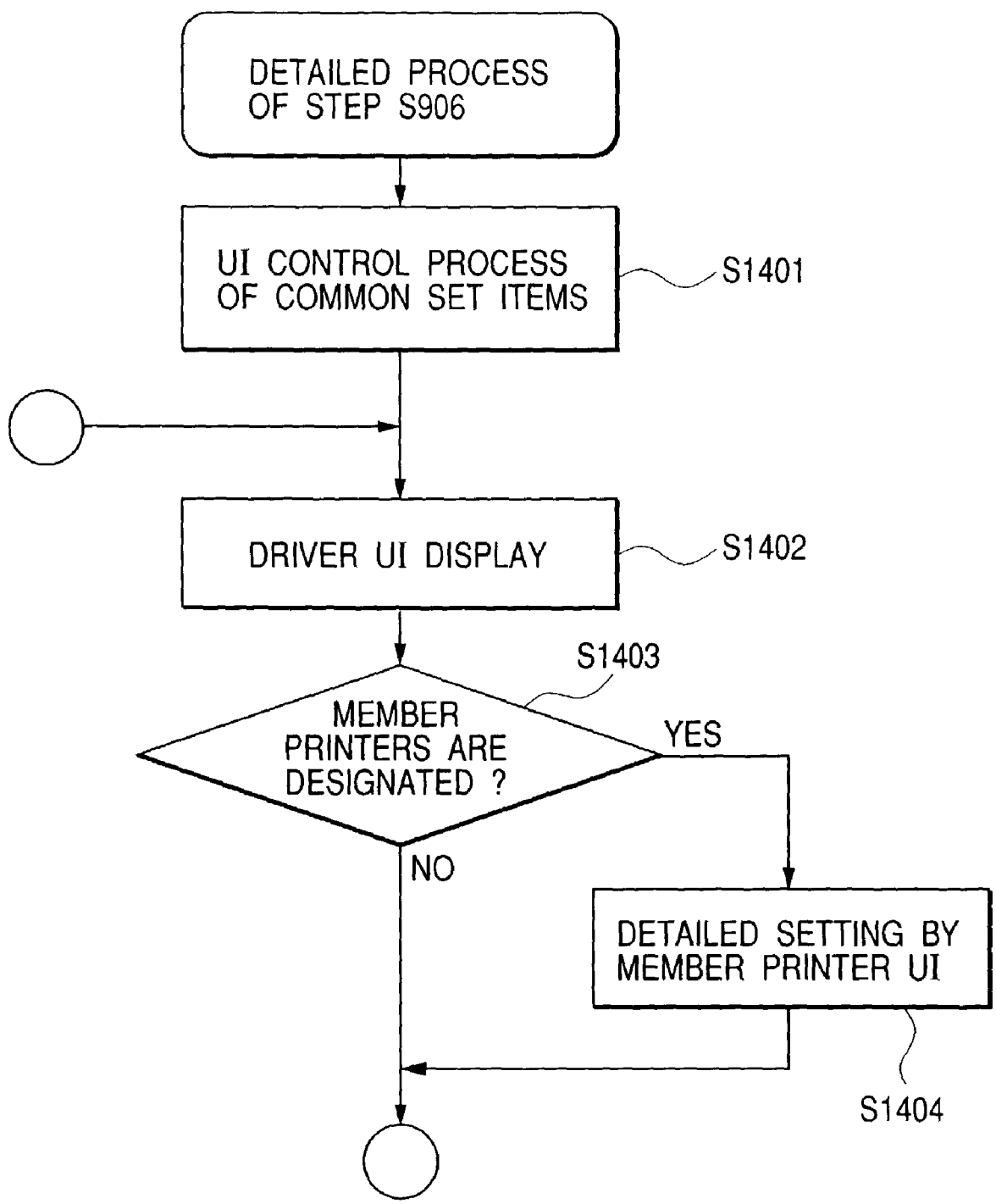
FIG. 14 is a control flowchart showing the operation of the group printer driver.

FIG. 14 is a flowchart showing the detailed process of step S906.

The process in this flowchart corresponds to a process in the case where the member printer drivers are constructed by a mixture of the "function controllable drivers" and the "function uncontrollable drivers" or by only the "function uncontrollable drivers" unlike the case where the processing routine advances to step S905. Therefore, the items which can be set by the group printer driver UI are limited to the common set items in which the set information can be read out and written in common.

In step S1401, in a manner similar to step S1301, ability regarding each common set item of each member printer driver is inquired, the conflicting process regarding each function (each item) is executed, and the items which are displayed by the group printer driver UI are further selected (extracted) from the common set items on the basis of the result of the conflicting process.

In step S1402, the group printer driver UI is displayed on the basis of the result of the UI conflicting process performed in step S1401. With respect to the items having no function or the expansion set items as a result of the conflict, control is made so that they cannot be set on the UI by a method whereby it is gray-out displayed, is not displayed, or the like as described above.

In step S1403, whether an instruction to open the UI of the member printer driver in order to set each item or expansion set items (unique set items which each member printer driver has) controlled so that they cannot be set in step S1402 has been issued or not is discriminated.

When it is recognized that the member printer driver has been designated via the group printer driver UI so as to be set in detail, the processing routine advances to step S1404.

In step S1404, the UI of the member printer driver designated in step S1403 is opened, thereby allowing the setting of the individual member printer driver to be performed in accordance with the instruction inputted via the pointing device such as a mouse or the like. The designation of the predetermined member printer driver is performed, for example, via the UI of the group printer driver shown in FIG. 18 in a manner similar to FIG. 13.

Figure 15:
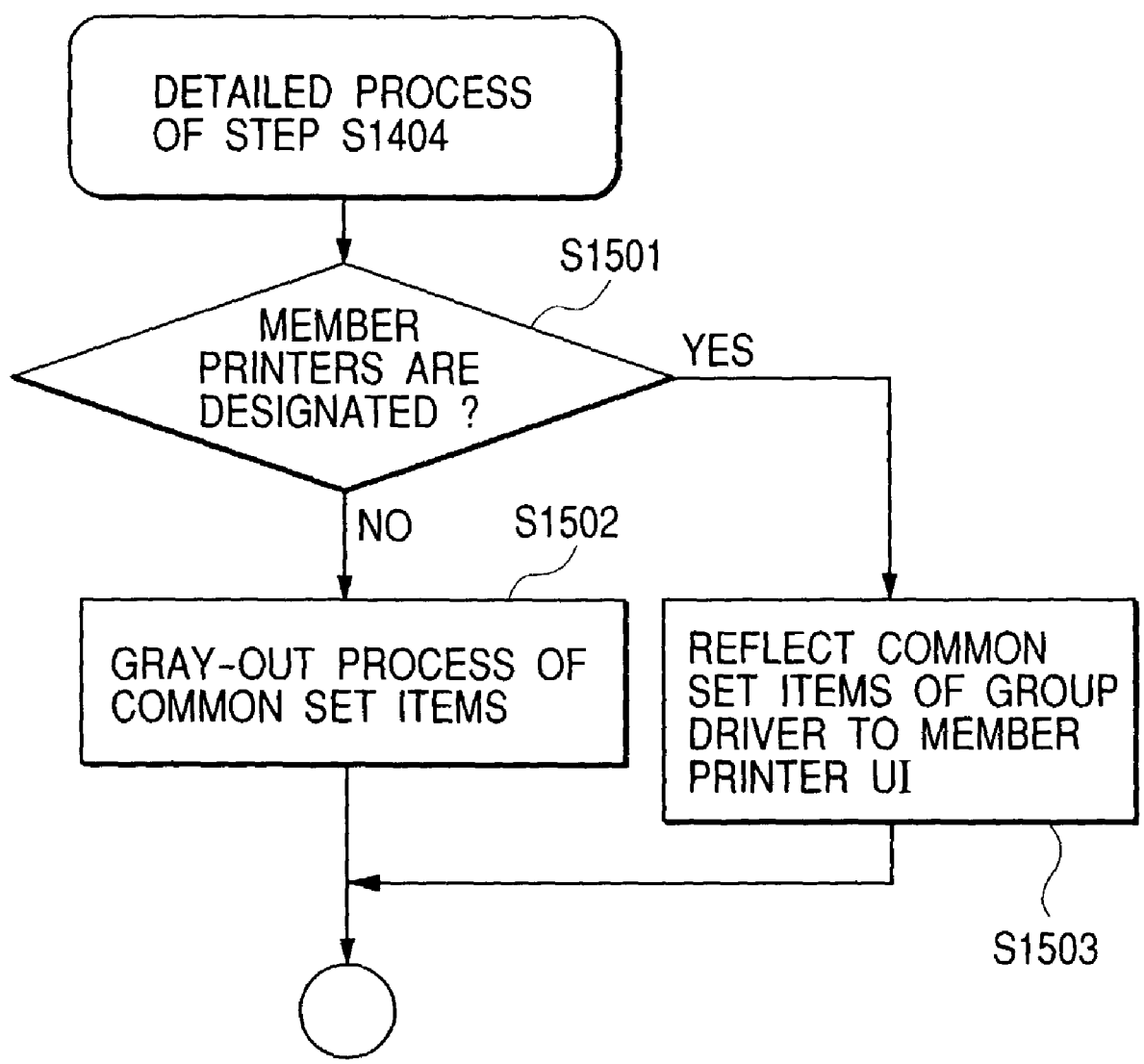
FIG. 15 is a control flowchart showing the operation of the group printer driver.

FIG. 15 is a flowchart showing further details of the process of step S1404.

In step S1501, the kind of member printer driver is discriminated.

If the designated member printer driver serving as a target is the "function controllable driver", step S1502 follows; otherwise, the processing routine advances to step S1503.

The discrimination of the kind of member printer driver is realized, for example, by a process such that when the expansion set items are read out via the OS, whether the obtained data is data which can be recognized or not is discriminated, that is, if the data is recognized, the driver is determined to be the "function controllable driver", or a process for discriminating the identification information or the like of the providing source allocated to the member printer driver.

In step S1502, the control of the common set item UI of the member printer driver is made in accordance with the rule shown in (1) in step S1305. The UI display control subjected to the gray-out control or the like of the UI is made to the common set items. A predetermined print setting is executed via the member printer driver UI to which the display control has been made.

In step S1503, the display control of the common set item UI of the member printer driver is made in accordance with the rule shown in (2) in step S1305. The detailed print setting is executed via the UI to which the display control has been made.

If all of the setting operations are finished on the group printer driver UI in step S907, by pressing an "end of setting" button, the processing routine advances to a series of processes for finishing the setting.

In step S908, whether the items set by the group printer driver are not contradictory as set items of each member printer driver or not is discriminated.

Specifically speaking, the printer has an item which is intimately concerned with the function which the device has. For example, in case of the printer A, the position on the paper of the A4 size where the stapling operation is possible is limited to only the upper left position of the paper and in case of the printer B, the position on the paper of the A4 size where the stapling operation is possible is limited to only the lower left position of the paper.

In this step, in addition to the conflict check executed in step S1303 for each member printer driver, that is, the conflict check about the combination which is impossible on the setting functions, whether the items set on the group printer driver UI can be reflected to each member printer driver, as set items of each member printer driver, or not is discriminated with regard to the member printer drivers as targets.

In step S909, a result of the conflict check executed in step S908 is discriminated.

If the set items set on the group printer driver UI are proper in all of the member printer drivers, the processing routine advances to step S912. The process for displaying the group printer driver UI is finished.

If it is determined in step S909 that the item which will cause a conflict (inconvenience) exists among the set items, step S910 follows. A "reset" button and a "forced" button are UI displayed together with a message "set items are reset on the group printer driver UI?" or "printing process is executed in the present set items?".

In step S911, whether the "reset" button or the "forced" button has been pressed is discriminated. If the "reset" button is pressed, the processing routine is returned to a just-previous process in step S1303 (in the case where the member printer driver is the "function controllable driver") or step S1402 (in the case where the member printer driver is the "function uncontrollable driver") in accordance with the construction of the member printer driver.

If the "forced" button is pressed, the processing routine advances to a process in step S912 and the process for displaying the group printer driver UI is finished.

A relation between the recording of the information set by the foregoing UI and the foregoing general print file in FIG. 8 in the embodiment will now be described.

In the embodiment, with respect to the information set by the foregoing UI, the driver set information (DEVMODE) of the group printer driver is recorded into the foregoing print instructing portion in the general print file described in FIG. 8 in each of the common area and the expansion area. Driver set information (DEVMODE) of each member printer driver is recorded into the driver information setting portion of the member printer driver in the general print file in each of the common area and the expansion area.

After that, the general print file is used in the printing process using the foregoing print job control system and the print in the embodiment can be executed.

A display state of the user interface of the group printer driver in step S1303 or S1402 mentioned above will now be described.

In the embodiment, by opening the group printer driver UI, a desired outputting method of the user can be properly selected from a plurality of kinds of outputting methods. For example, the outputting method of one of the ratio distribution, color/black and white distribution, multiple address, and automatic substitution can be set. By designating and setting the member printer driver for each mode, a plurality of print instructions can be made from one printer driver.

Figure 17:
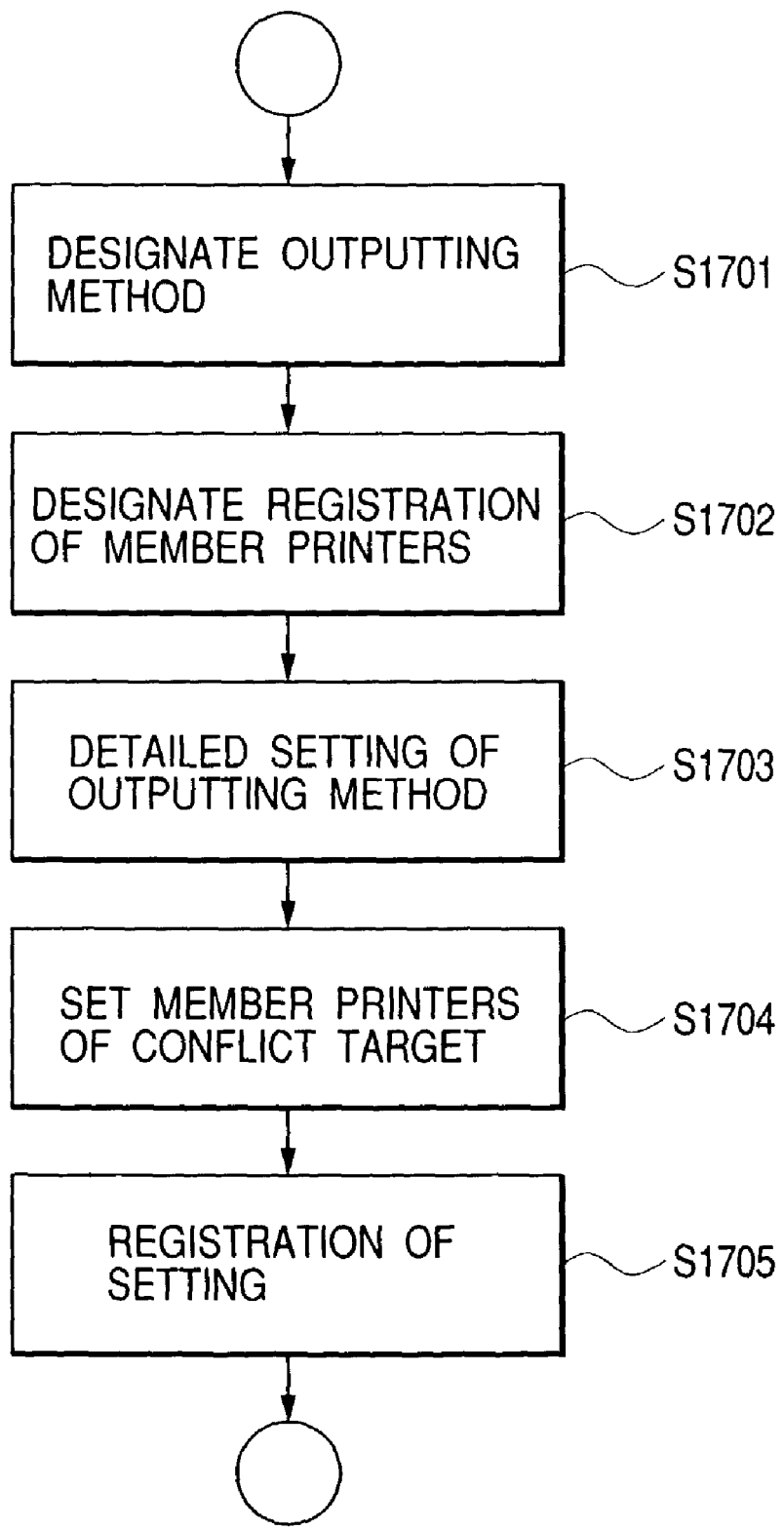
FIG. 17 is a control flowchart showing the operation of the group printer driver corresponding to a designated outputting method.

FIG. 17 is a flowchart showing the UI operation flow in the embodiment.

First, in step S1701, the outputting method is designated. As an outputting method, one of the ratio distribution, color/black and white distribution, multiple address, and automatic substitution can be selected as mentioned above. However, the invention is not limited to those methods. Naturally, another outputting method of the printing process for a plurality of printer devices as targets can also be applied.

In next step S1702, the member printer driver designated in each outputting method is registered. The member printer driver registered for each respective outputting method corresponds to the member printer driver which is displayed in accordance with the outputting method designated by the present control program. A combination of the member printer drivers which have been registered every outputting method and is constructed every outputting method is concerned with a process such that the present control program recognizes the outputting methods designated via the group printer driver UI and controls so as to switch and display the member printer driver corresponding to the recognized predetermined outputting method.

In the next step, S1703, detailed designation of each outputting method is performed as will be explained hereinbelow.

In the next step, S1704, the member printer driver as a conflict target in each outputting method is set. The member printer driver as a conflict target corresponding to each outputting method corresponds to the member printer driver registered in step S1702. Further, the conflicting process regarding the group printer driver and the member printer drivers described in FIGS. 9 to 16A and 16B is executed to the member printer drivers set here.

By the processes in the flowchart of FIG. 17, when the setting of the outputting method is switched in accordance with the selection of the outputting method by the group printer driver which can control a plurality of member printer drivers, control is made in a manner such that the display of the user interface for setting the outputting method can be switched in accordance with the kind of switched outputting method. Therefore, even if the outputting method is properly changed, the user can obtain the user interface for performing the optimum print setting to the changed outputting method. The user interface for performing the optimum print setting according to the outputting method is based on the conflicting process as described in FIGS. 9 to 16B or relates to the print setting that is peculiar to each outputting method, which will be explained hereinlater. As will be also explained hereinbelow, the detailed method of the conflicting process also differs depending on each outputting method and the user interface for the print setting according to the outputting method also differs in accordance with the different outputting method.

As one example of the embodiment, if the ratio distribution (same meaning as the distribution printing) is selected as an outputting method, it is assumed that the member printer drivers as conflict targets are set to the printer drivers of all of the member printers on the distribution destination side as targets.

In the next step, S1705, each of the set items is recorded. The recording of the set items is realized by recording them into the general print file described in FIG. 8. For example, the set items are recorded by using the print instructing portion 8-*a* of the general print file, particularly, by using the outputting method designating portion in the set items in step S1701. In the set items in step S1702, they are recorded by using the number of member printers, the member printer driver name, and the member printer driver set information portion. In the set items in step S1703, they are recorded by using the group printer driver set information portion.

The user interface (group printer driver UI) in the embodiment will be specifically explained with reference to FIG. 18.

In FIG. 18, reference numeral 1801 denotes a combo box for selecting and designating the outputting method described in step S1701 in FIG. 17 mentioned above. When the combo box 1801 is instructed via a pointing device such as a mouse or the like, a list of a plurality of outputting methods is displayed and a predetermined outputting method is designated from the displayed list.

Reference numeral 1802 denotes a button for opening the UI to register the member printer drivers described in step S1702 in FIG. 17. The UI which is opened here will be explained hereinlater.

Reference numeral 1803 in FIG. 18 denotes a list box for displaying a list of the registered member printer drivers after the member printer drivers were registered.

In the example of this UI, together with the names of the member printer drivers, various information regarding the member printer drivers is also displayed. Contents of the list display are also changed in accordance with the outputting method designated in step S1701 mentioned above. That is, the system has the construction of the member printer drivers every plural kinds of outputting methods. Thus, the user can easily call the suitable member printer drivers every outputting method and there is no need to register a new member printer drivers each time the outputting method is changed.

Reference numeral 1807 denotes check boxes for preventing that the registered member printer drivers described in S1702 in FIG. 17 mentioned above are not temporarily included in the construction as output target printer drivers or adding them into the construction of the member printer drivers from such a state where they are not included. If the check boxes 1807 are marked, the member printer drivers are regarded as target printer drivers. If the check boxes 1807 are not marked, a process for temporarily removing the member printer drivers from the target printer drivers is executed. That is, this process corresponds to the primary registering process of the member printer drivers in step S1702 mentioned above and the process for setting the member printer drivers to the target printer drivers of the actual printing process by marking the check boxes corresponds to the secondary registering process.

As mentioned above, in the registration of the member printer drivers, the setting mechanism of two stages of the primary registration and the secondary registration can be realized by the invention. For example, in the ordinary distribution printing, with respect to the predetermined member printer driver as a target of the printing process, the predetermined member printer driver can be temporarily removed from the targets due to a failure or the like of the printing apparatus corresponding to such a member printer driver, or contrarily, if the failed printing apparatus is recovered, this member printer driver can be again set to the member printer driver which is activated at the time of the actual printing process by marking the check box. The above operation is realized by a construction such that the member printer drivers registered every outputting method in step S1702 and the information of the discrimination about whether the member printer drivers have been set to the member printer drivers which are used by marking the check boxes or not are independently held in predetermined storing portions, respectively.

Further, in the invention, the primary registration and the secondary registration described above can be set every plural outputting methods, and the primary registration and the secondary registration are independently processed for each of the multiple address print, color/black and white distribution printing, and substitute print, which will be explained hereinlater, as well as the ratio distribution printing. The above process can be realized by having a construction such that the setting states of the primary registration and the secondary registration are stored and held into the predetermined storing portions and, further, a construction such that the held information is referred to and displayed. In the case of holding the setting states of the primary registration and the secondary registration every outputting method, a similar effect is obtained not only by a method whereby the set information of the primary registration and the secondary registration is completely stored every plural outputting methods but also a method whereby the primary registration and the secondary registration are independently set for at least two or more outputting methods.

Reference numeral 1806 denotes a display column of attribute information of each device. This display column corresponds to a column where the attribute information of the device corresponding to each member printer driver set in the group printer driver is displayed together with the names of the member printer drivers in accordance with the display control of the control program.

Reference numeral 1804 in FIG. 18 denotes a button for opening the UI for designating details of the outputting method in step S1703 in FIG. 17 mentioned above. Contents of the detailed setting are also changed in accordance with the outputting method designated in step S1701 mentioned above.

Reference numeral 1805 in FIG. 18 denotes a button for displaying the member printer driver UI for performing the detailed print setting of the member printer driver. With respect to a predetermined member printer driver inputted and instructed via the pointing device such as a mouse or the like from the list of the list box 1803, when a depression signal of the button 1805 is inputted to the information processing apparatus, the UI of the member printer driver recognized as being selected is called and displayed.

When the individual UI of the member printer driver is called and displayed, the conflicting process is executed to the member printer driver set in step S1704 in FIG. 17 mentioned above. The UI of the member printer driver to which a result of the conflicting process has been reflected is displayed.

Subsequently, registration/deletion of the member printer driver will be described with reference to FIG. 19.

Figure 19:
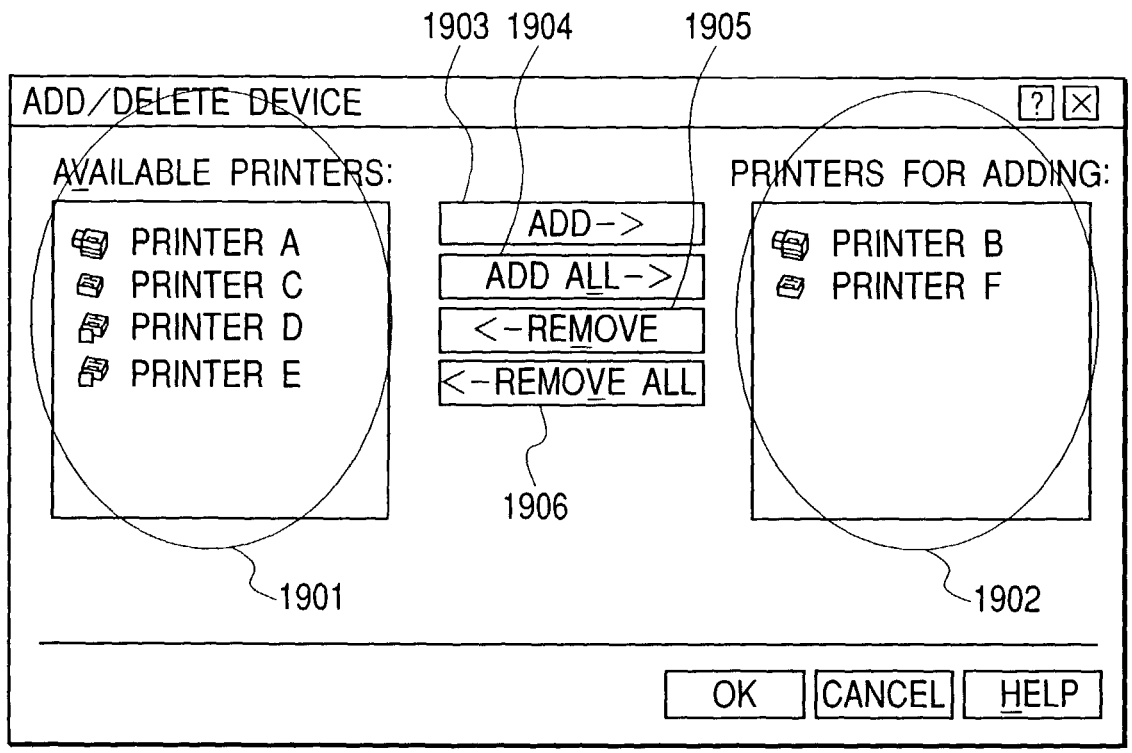
FIG. 19 is a diagram showing an example of a display state of the UI having adding/deleting (registering) functions of the member printer driver.

FIG. 19 is a diagram showing the UI which is displayed when the control program recognizes the depression signal of an "addition/deletion of device" button 1802 in FIG. 18 described above.

In FIG. 19, reference numeral 1901 denotes a list box for displaying a list of member printer drivers which can be selected. The member printer drivers which can be selected denote printer drivers to which the port which can be handled by the present system has been allocated and which have been installed, and denote printer drivers whose existence can be recognized by the present control system.

Reference numeral 1902 denotes a list box for displaying a list of the selected member printer drivers. A desired member printer can be added to or deleted from the list of the selectable member printers by operating buttons 1903, 1904, 1905, and 1906.

When a depression signal of the button 1903 is recognized, a process for adding the printer driver selected at the time of depression in the list box 1901 as one component element of the member printer drivers is executed.

When a depression signal of the button 1904 is recognized, control is made so that the member printer drivers displayed in the list box 1902 are constructed with respect to all of the printer drivers shown in the list 1901 as targets.

Reference numeral 1905 denotes the button for removing a desired member printer driver from the member printer drivers on the contrary to the cases of the buttons 1903 and 1904. When depression signals of the buttons 1903 and 1905 are recognized, the target member printer drivers are controlled so as to remove the desired member printer driver from the construction of the member printer drivers in the list 1902.

The detailed setting of the outputting method in step S1703 in FIG. 17 mentioned above will now be described with reference to FIG. 20.

Figure 20:
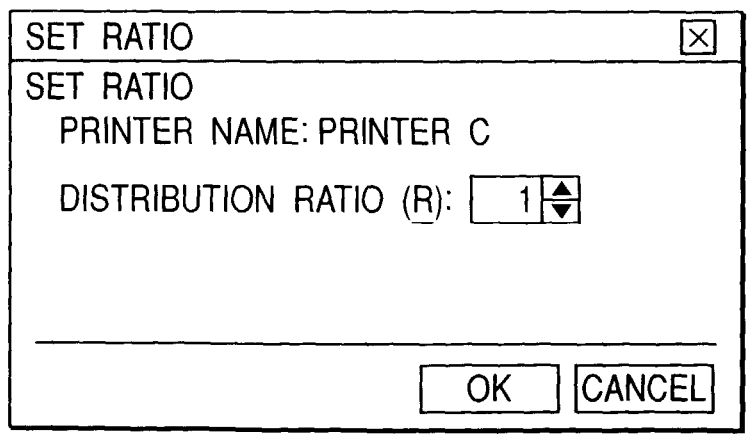
FIG. 20 is a diagram showing an example of a display state of the UI for setting details of the outputting method.

FIG. 20 is a diagram of the UI which is displayed by pressing the button 1804 in FIG. 18 mentioned above. This UI corresponds to the UI which enables the detailed setting for the member printer driver selected from the list 1803 in FIG. 18.

Since the ratio distribution has been selected and designated here as an outputting method in FIG. 18, the UI which is displayed here is the UI for performing the ratio setting of the printing process of each member printer driver at the time of the distribution printing. A distribution ratio of the designated member printer driver can be designated by an integer value.

Second Embodiment

In the second embodiment, an explanation will be made with respect to an example in the case where the color/black and white distribution has been selected and set as an outputting method in step S1701 in FIG. 17 in the first embodiment.

In the second embodiment, a fundamental flow of processes is substantially the same as that of the first embodiment, except that the UIs which are displayed in steps S1702 and S1703 in FIG. 17 and the setting of the member printer drivers as conflict targets which are set in S1704 are merely different from those in the first embodiment, and other aspects of the construction are the same. Therefore, it is assumed that only portions which are peculiar to those examples are extracted and explained.

Figure 21:
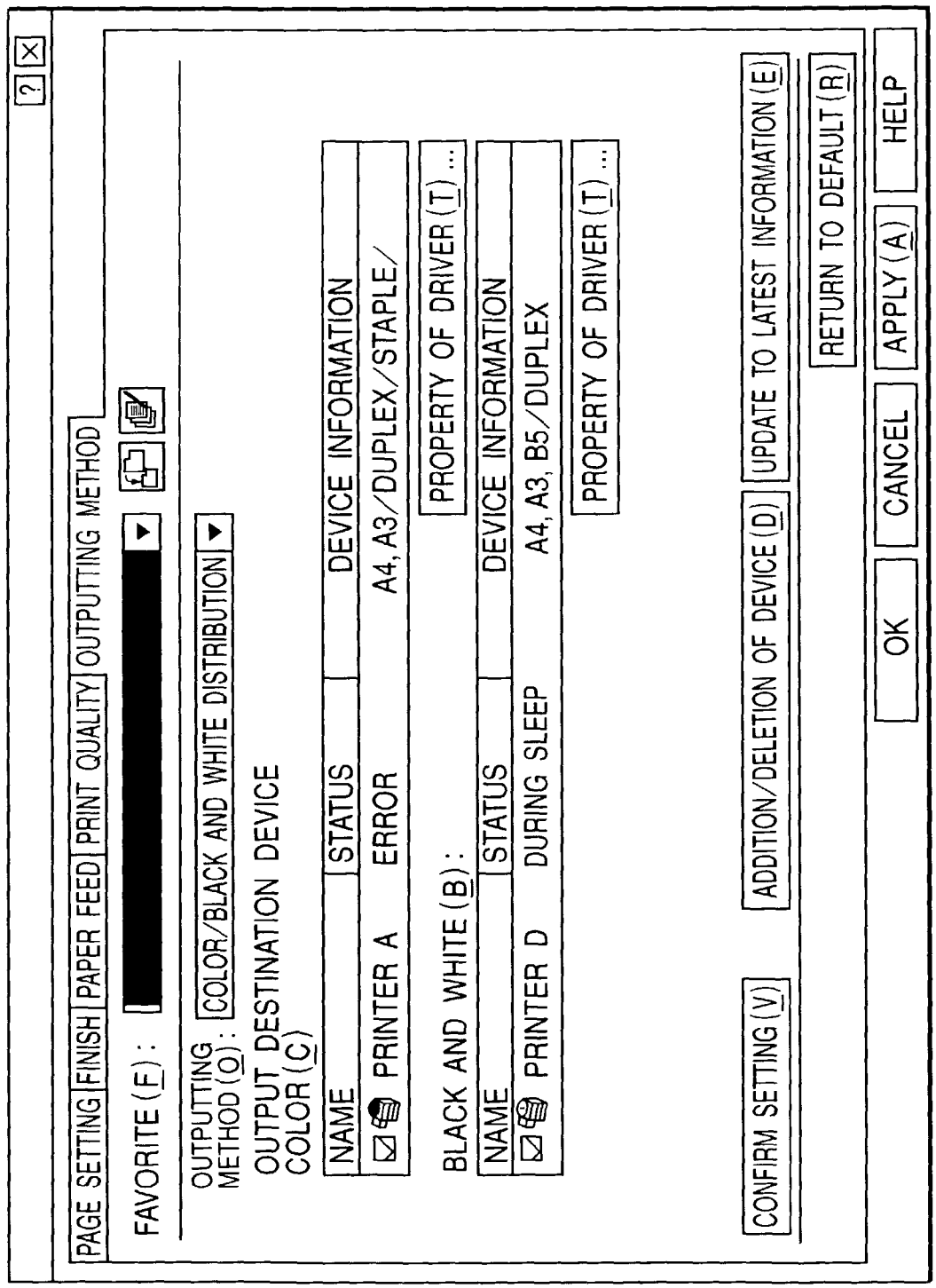
FIG. 21 is a diagram showing an example of a display state of the UI at the time when a color/black and white distribution printing has been designated as an outputting method.

FIG. 21 is a diagram showing an example of a display state of the UI of the group printer driver at the time when the color/black and white distribution has been designated as an outputting method in step S1701 in FIG. 17.

The color/black and white distribution denotes a form such that a color page in a document is controlled so as to be processed by a color printer driver, a black and white page is controlled so as to be processed by a monochromatic printer driver, and they are printed and outputted by a color printer device and a monochromatic printer device, respectively. As a member printer construction, one color printer and one monochromatic printer are used. That is, the member printer drivers are constructed by a printer driver corresponding to the color printer device and a printer driver corresponding to the monochromatic printer device. A member printer driver UI for performing the detailed setting of each member printer driver can be displayed by the operation similar to that in the case described in FIG. 18.

In correspondence to the form as shown in FIG. 21, the color printer driver and the monochromatic printer driver are respectively registered in step S1702 in FIG. 17 and the user interface as shown in FIG. 21 is constructed.

In the detailed designation of the outputting method in step S1703 in FIG. 17, according to the embodiment, a button to instruct the further detailed designation of the outputting method such as a "set ratio" button described in FIG. 18 is not displayed. However, for example, in a display picture plane of FIG. 21, it is also possible to provide a button for performing the detailed setting regarding a substitute destination such as a discrimination about whether the substitute print by the monochromatic printer is permitted to the substitute destination at the time of a fault substitution in the color printer or not, or the like.

Further, with respect to the setting of the member printer as a conflict target in step S1704 in FIG. 17, in the second embodiment, if the color/monochromatic distribution has been selected as an outputting method, as for the member printer as a conflict target, it is also possible to presume a form such that the conflicting process is executed to the set items regarding the color by the member printer driver corresponding to the color printer, and the conflicting process is executed to other print items by a combination of the member printer driver corresponding to the color printer and the member printer driver corresponding to the monochromatic printer. That is, in the case where the printer driver of the color printer and the printer driver of the monochromatic printer have been selected as member printer drivers in the color/monochromatic distribution, respectively, setting possible information of the member printer driver of the color printer is referred to with respect to the items peculiar to the color printer, with respect to the items (for example, paper size and the like) which are referred to in common by the color printer and the monochromatic printer, the items of both of the member printer drivers are referred to, and the conflicting process is executed.

For example, although the set item regarding the color in FIG. 11 is only the gray scale of the common set items, it is shown as an example, and naturally, a case where other items are changed/added in dependence on the functions of the member printer drivers is properly presumed.

Third Embodiment

In the third embodiment, an explanation will be made with respect to an example in the case where the multiple address has been selected and set as an outputting method in step S1701 in FIG. 17 in the first embodiment.

In the third embodiment, the fundamental flow of processes is substantially the same as that of the first embodiment, except that the UIs which are displayed in steps S1702 and S1703 in FIG. 17 and the setting of the member printer drivers as conflict targets which are set in S1704 are different from those in the first embodiment, and other aspects of the construction are the same. Therefore, the points of difference will be explained particularly in detail.

FIG. 22 is a diagram showing an example of a display state of the UI in the case where the multiple address print has been selected and set as an outputting method via the predetermined pointing device such as a mouse or the like.

The multiple address print indicates a print outputting method whereby all of a plurality of member printer drivers in which a document (print data) whose number of copies is equal to one are allowed to execute the printing process and the devices corresponding to the plural member printer drivers are allowed to execute the same document print.

As a construction of the member printer drivers, a plurality of member printer drivers can be registered in a manner similar to the case described in the ratio distribution (distribution printing).

The UI corresponding to each of the member printer drivers can be also opened and this process is realized in accordance with the operation similar to that described in FIG. 18. When a depression signal indicative of "property of driver" in FIG. 22 is inputted to the information processing apparatus with respect to the predetermined member printer drivers which were inputted and designated from a plurality of output destination devices (Printer A, Printer B, and Printer C in FIG. 22) in FIG. 22 via the pointing device such as a mouse or the like, the UIs of the member printer drivers which are recognized as being selected are called and displayed.

If multi-address printing has been set as an outputting method in correspondence to step S1701 in FIG. 17, in a manner similar to the case of the ratio distribution described above, the UI as shown in FIG. 19 is displayed in response to an input of a depression signal of the "addition/deletion of device" button in FIG. 22, so that the registration/deletion of the member printer drivers which are activated in the multi-address printing is realized (corresponding to step S1702 in FIG. 17).

With respect to the detailed setting of the outputting method (detailed setting regarding the multi address print in the third embodiment) corresponding to step S1703 in FIG. 17, in case of FIG. 22, the button to perform the detailed setting is not particularly displayed for the multi address print. However, for example, it is also possible to construct the control in a manner such that if some trouble occurs in the printers on the multi-address printing destination side or in the printer drivers and the print data (PDL or intermediate file data) formed normally is not transmitted, the number of times for retrying the transmission of the print data or the like can be set.

If the multi-address printing has been set as an outputting method in the third embodiment, according to the process corresponding to the conflicting process in step S1704 in FIG. 17, since all of the member printer drivers become the targets of the conflicting process in a manner similar to the case of the ratio distribution printing, its detailed description is omitted.

Fourth Embodiment

In the fourth embodiment, an explanation will be made with respect to an example in the case where the automatic substitute print has been selected and designated as an outputting method in step S1701 in FIG. 17 in the first embodiment.

In the fourth embodiment, the fundamental flow of processes is substantially the same as that of the first embodiment, except that the UIs which are displayed in steps S1702 and S1703 in FIG. 17 and the control of extraction of the target member printer drivers of the conflicting process which is executed in step S1704 can be mentioned as points which are different from those in the first embodiment, and a detailed explanation of other processes with respect to portions similar to those in the first to third embodiments is omitted here.

Figure 23:
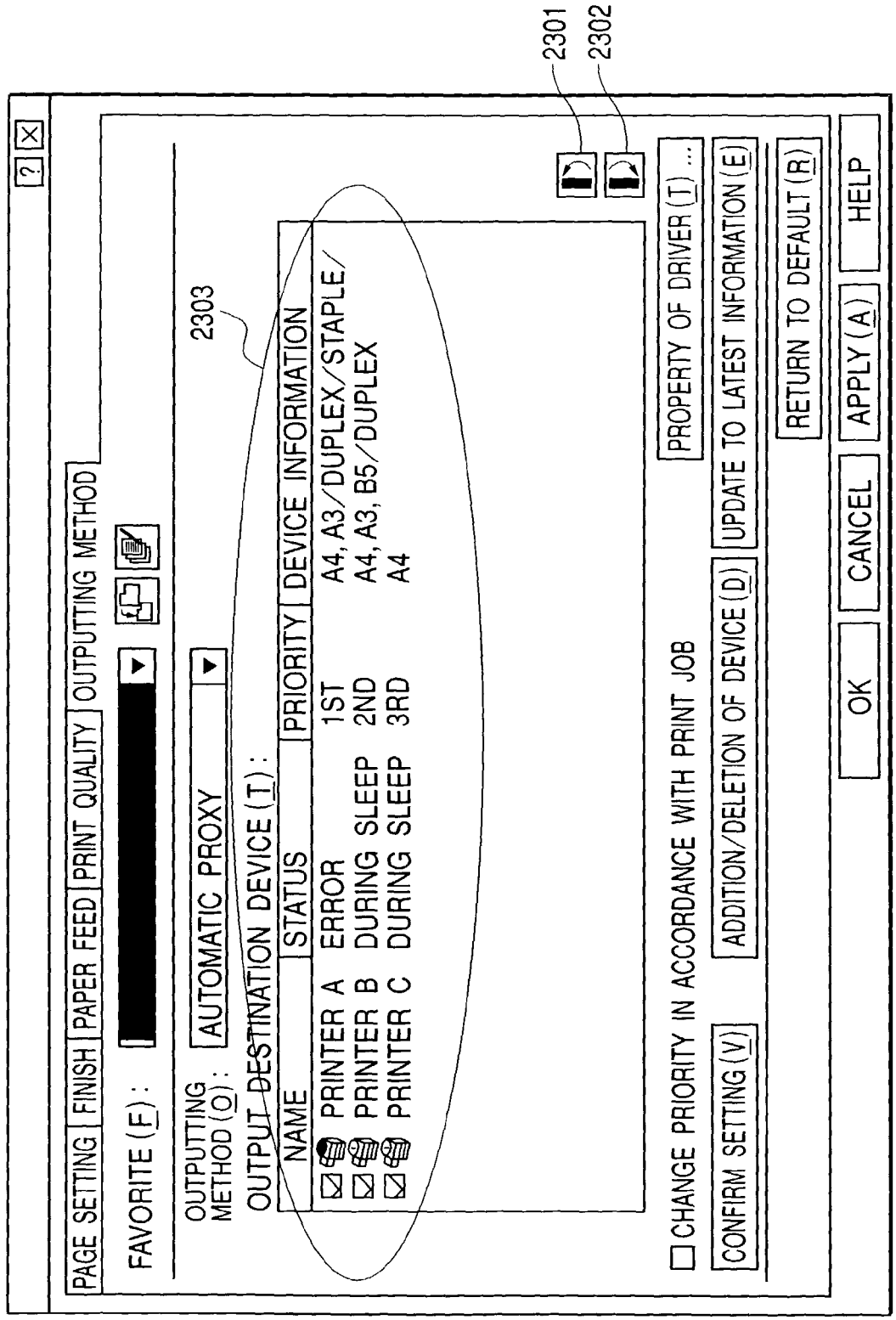
FIG. 23 is a diagram showing an example of a display state of the UI at the time when a automatic substitute print has been designated as an outputting method.

FIG. 23 is a diagram showing an example of a display state of the UI in the case where the automatic substitute print has been selected and set as an outputting method in step S1701 in FIG. 17.

In the automatic substitute print in the fourth embodiment, a priority is allocated to each of the member printer drivers, and first, the print is preferentially executed by the member printer driver having the highest set priority. If an error such as absence of toner or the like occurs in the printer device to be subjected to the printing process at present and the printing becomes impossible, control is made so as to allow the member printer driver having the second highest priority automatically to execute the printing process.

In this case, as a construction of the member printer drivers, in a manner similar to the case of the ratio distribution (distribution printing), a plurality of member printer drivers can be registered and the control program has a function for setting the priority to each member printer driver.

In FIG. 23, reference numerals 2301 and 2302 denote buttons for changing the priority of each member printer driver. In the example of this UI, the priority of the member printer coincides with the order written in a member printer list 2303.

Therefore, a desired member printer driver is selected from the list 2303 and the order on the member printer list can be raised by one (upward movement display) by operating the button 2301 and the priority can be also raised.

The order on the member printer list can be reduced by one (downward movement display) by operating the button 2302, and the priority can be also reduced. Since the process to open the GUI of each member printer can be realized by a process similar to that described in FIG. 18 and the like, its detailed description is omitted here.

The registration (addition/deletion) of the member printer driver corresponding to step S1702 in FIG. 17 is also executed in a manner as described in the second embodiment. Control so as to display the UI similar to that shown in FIG. 19 is made and a registering/deleting process of the member printers is executed.

Since the process for the detailed setting of the outputting method in step S1703 in FIG. 17 does not particularly exist in the embodiment, a button for such a process is not provided in the UI of FIG. 19.

As for the setting of the member printer driver serving as a target of the conflicting process in step S1704 in FIG. 17, if the automatic substitute print has been set as an outputting method, a form such that, as a member printer driver of the conflict target, the setting conditions of the member printer driver having the highest priority are preferentially used is presumed. By selecting the setting of the member printer driver having the highest priority as mentioned above, even if the substitute printing process is executed, a situation such that the setting in the member printer driver having the highest priority is limited can be prevented. Naturally, a form such that the conflicting process to perform an AND process for discriminating the presence or absence of each set item is executed with respect to all of the member printer drivers registered as targets in a manner similar to the first embodiment is also presumed.

As mentioned above, as shown in FIGS. 18, 21, 22, and 23, the member printer drivers can be registered every outputting method in accordance with the designation of the outputting method, and the construction of the registered member printer drivers is switched and displayed in accordance with the designation of the outputting method. Therefore, the user can easily recognize the member printer drivers which are managed every outputting method and use them.

Processes for setting and obtaining the device information (attribute information of the device) shown at 1806 in FIG. 18 will now be described with reference to FIG. 24.

Figure 24:
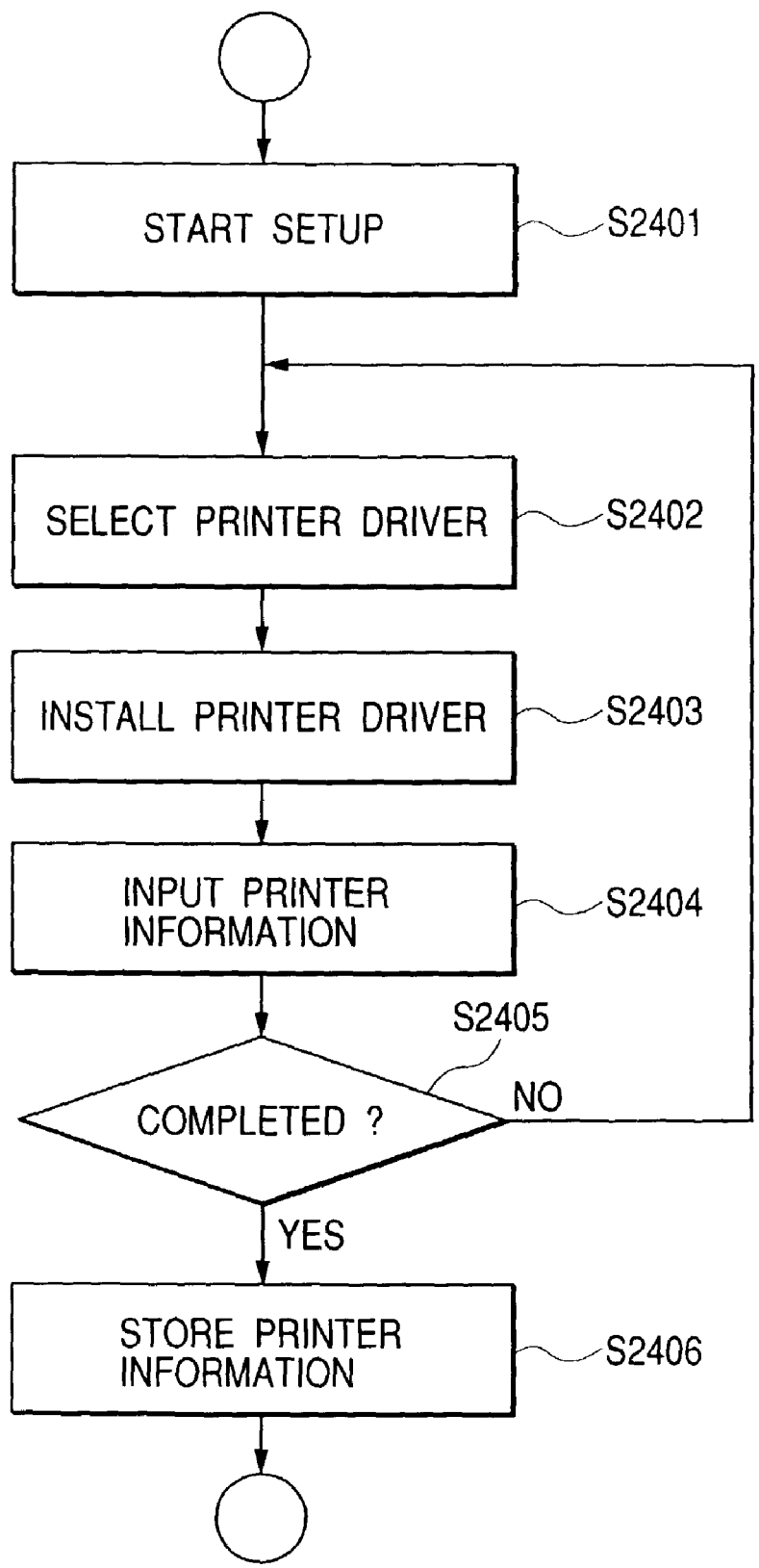
FIG. 24 is an operation flowchart for obtaining attribute information of the member printer driver in the group printer driver.

FIG. 24 shows a flowchart for setting the printer driver which is installed into the system so as to become the target of the member printer when the system is set up and, at the same time, setting (obtaining) information of the device.

First, in step S2401, the setup is started.

Next, in step S2402, the printer drivers serving as targets of the member printers are selected and set to targets of the installation.

Subsequently, in step S2403, the selected printer drivers are installed and registered and set as member printer drivers. That is, the drivers installed in step S2403 are registered as member printer drivers in step S1702 in FIG. 17 described above.

The device information of each printer driver installed in step S2403 is obtained. As device information, as attributes of the target devices of the installed printer drivers, for example, information of whether a support paper size is equal to A3, A4, or B5, whether a duplex print is possible or not, whether a stapling print is possible or not, and other information about a finishing function regarding whether punching holes can be formed or not, whether a Z-folding process is possible or not, or the like are inputted. As a form of obtaining the device information, the following forms are presumed: that is, a form such that each of the installed printer drivers inquires of the corresponding printer device via a predetermined network and obtains the device information and the control program obtains this device information; a form such that the control program obtains the device information which the member printer drivers preliminarily have as default values; or a form such that set values inputted from the keyboard or the like are registered as device information.

Subsequently, in step S2405, whether the installation of the target member printer drivers has been completed or not is discriminated. If it is not completed, the processing routine is returned to step S2402, and the process for registering the printer driver selected in accordance with a predetermined selecting operation as a member printer driver is repeated. On the other hand, if the installation has been completed, the processing routine advances to step S2406. The discrimination about the completion is made by, for example, recognizing the selection of "Yes" or "No" by the user in response to a message "installation is completed?" displayed in the display unit of the information processing apparatus.

In step S2406, the set values of the attribute information of the device obtained in step S2404 are stored and held in, for example, a registry or the like of the system together with the name of the printer driver. The attributes of the device obtained in step S2404 are held in a predetermined storing portion together with the construction of the member printer drivers in accordance with each of the outputting methods registered in step S1702.

The device information shown in 1806 in FIG. 18 corresponds to the information which has been held in step S2406 and has been displayed for every relevant member printer.

As mentioned above, since the attribute information of the device corresponding to each printer driver is displayed together with the names of the member printer drivers constructing the group printer driver, the user can know at a glance which attributes (functions) the devices corresponding to a plurality of member printer drivers have. With respect to the primary registration and the secondary registration described in 1806 in FIG. 18, since the attribute information corresponding to each member printer driver is displayed by the processes shown in the flowchart of FIG. 24, an effect such that the user can easily decide whether the secondary registration is performed or not from the member printer drivers which have properly been primary-registered in accordance with a demand of print.

Other Embodiments

The objects of the invention are also accomplished by a method whereby a memory medium in which program codes of software to realize the functions of the embodiments mentioned above have been stored is supplied to a system or an apparatus, and a computer (or a CPU or an MPU) of the system or apparatus reads out the program codes stored in the memory medium and executes them.

In this case, the program codes themselves read out from the memory medium realize the functions of the embodiments mentioned above. The memory medium in which the program codes have been stored constitutes an embodiment of the invention.

As a memory medium for supplying the program codes, for example, a floppy disk, a hard disk, an optical disk, a magnetooptic disk, a CD-ROM, a CD-R, a magnetic tape, a nonvolatile memory card, an ROM, or the like can be used.

The invention incorporates not only a case where a computer executes the read-out program codes, so that the functions of the embodiments mentioned above are realized, but also a case where an OS (Operating System) or the like which operates on the computer executes a part or all of actual processes on the basis of instructions of the program codes, and the functions of the embodiments mentioned above are realized by those processes.

Further, the invention incorporates a case where the program codes read out from the memory medium are written into a memory equipped for a function expanding board inserted in a computer or a function expanding unit connected to a computer and, thereafter, a CPU or the like equipped for the function expanding board or function expanding unit executes a part or all of actual processes on the basis of instructions of the program codes, and the functions of the embodiments mentioned above are realized by those processes.

As mentioned above, according to the embodiments, in the print processing system for controlling print jobs to a plurality of image input/output apparatuses bound to one virtual image input/output apparatus, the outputting method such as ratio distribution, color/black and white distribution, multiple address, automatic substitution, or the like can be switched on the driver for one virtual image input/output apparatus and the print can be executed. The construction of a plurality of image input/output apparatuses bound on the driver corresponding to one virtual image input/output apparatus can be changed.

In association with the change in outputting method, the UI control of the driver corresponding to one virtual image input/output apparatus and the UI control of each of the drivers corresponding to a plurality of image input/output apparatuses bound to such a driver can be switched and the data can be outputted.

As described above, according to the invention, upon construction of the printer drivers of the distribution printing, multiple address print, automatic substitute print, and the like, reconstruction of a combination of the printer drivers can be easily realized.

A construction for enabling the flexible registering process to be more easily realized can be provided while providing a mechanism which enables the flexible registering process upon registration of the printer driver.

What is claimed is:

1. A print control apparatus for controlling a print process by a plurality of outputting methods including at least a ratio distribution print and an automatic substitute print, each assigning a print job to a plurality of member printers, said print control apparatus comprising at least a processor and memory, functioning as:
   a primary registration unit constructed to register, as output target printers, a member printer selected, in response to a user instruction for member printer registration, from among the plurality of member printers for each of the plurality of outputting methods;
   a selection unit constructed to select one of the plurality of outputting methods;
   a switching unit constructed to switch between user interfaces in response to a selection by said selection unit, wherein the switched user interface (a) displays the construction of member printers registered by said registration unit for the one outputting method selected by said selection unit, and (b) allows setting or changing of features of the selected outputting method, which affects how a print job is assigned to a plurality of the displayed member printers without changing the construction; and
   a secondary registration unit constructed to register, from among member printers displayed on the user interface, one member printer to be used in a current print process as one of the output target printers, using check boxes provided on the user interface for the respective member printers, wherein a member printer designated with a corresponding check box is registered as one of the output target printers in the current print process and a member printer not designated with a corresponding check box is temporarily removed in the current print process from the output target printers; and
   a setting unit constructed to set a member printer as a conflict target used for checking conflicts with respect to print settings to be used in the current print process set by the user,
   wherein the one member printer removed by said secondary registration unit using the check box is displayed as one of the output target printers on the user interface in a next print process without re-registration by said primary registration unit,
   wherein status information and device information of each of the member printers are displayed in the user interface, and a temporary error status of the member printer can be recognized in the status information and a print ability of the member printer including at least a stapling function can be recognized in the device information,
   wherein, if said selection unit selects the ratio distribution print, the user interface allows setting of a distribution ratio for each member printer and said setting unit sets all the member printers displayed on the user interface as conflict targets, and
   wherein, if said selection unit selects the automatic substitute print, the user interface allows setting of a priority for each member printer and said setting unit sets the member printer with the highest priority as a conflict target.

2. A method of controlling a print process by a plurality of outputting methods including at least a ratio distribution print and an automatic substitute print, each assigning a print job to a plurality of member printers, comprising the steps of:
   a primary registration step of registering, as output target printers, a member printer selected, in response to a user instruction for member printer registration, from among the plurality of member printers for each of the plurality of outputting methods;
   a selection step of selecting one of the plurality of outputting methods;
   a switching step of switching between user interfaces in response to a selection in said selection step, wherein the switched user interface (a) displays the construction of member printers registered in said registration step for the one outputting method selected in said selection step, and (b) allows setting or changing of features of the selected outputting method, which affects how a print job is assigned to a plurality of the displayed member printers without changing the construction;
   a secondary registration step of registering, from among member printers displayed on the user interface, one member printer to be used in a current print process as one of the output target printers, using check boxes provided on the user interface for the respective member printers, wherein a member printer designated with a corresponding check box is registered as one of the output target printers in the current print process and a member printer not designated with a corresponding check box is temporarily removed in the current print process from the output target printers; and
   a setting step of setting a member printer as a conflict target used for checking conflicts with respect to print settings to be used in the current print process set by the user,
   wherein the one member printer removed in said secondary registration step using the check box is displayed as one of the output target printers on the user interface in a next print process without re-registration by said primary registration step, wherein status information and device information of each of the member printers are displayed in the user interface, and a temporary error status of the member printer can be recognized in the status information and a print ability of the member printer including at least a stapling function can be recognized in the device information, wherein, if said selection step selects the ratio distribution print, the user interface allows setting of a distribution ratio for each member printer and said setting step sets all the member printers displayed on the user interface as conflict targets, and wherein, if said selection step selects the automatic substitute print, the user interface allows setting of a priority for each member printer and said setting step sets the member printer with the highest priority as a conflict target.

3. A non-transitory computer-readable medium, storing a program for causing a computer to perform a method of controlling a print process by a plurality of outputting methods including at least a ratio distribution print and an automatic substitute print, each assigning a print job to a plurality of member printers, said program comprising the steps of:

a primary registration step of registering, as output target printers, a member printer selected, in response to a user instruction for member printer registration, from among the plurality of member printers for each of the plurality of outputting methods;

a selection step of selecting one of the plurality of outputting methods;

a switching step of switching between user interfaces in response to a selection in said selection step, wherein the switched user interface (a) displays the construction of member printers registered in said registration step for the one outputting method selected in said selection step, and (b) allows setting or changing of features of the selected outputting method, which affects how a print job is assigned to a plurality of the displayed member printers without changing the construction;

a secondary registration step of registering, from among member printers displayed on the user interface, one member printer to be used in a current print process as one of the output target printers, using check boxes provided on the user interface for the respective member printers, wherein a member printer designated with a corresponding check box is registered as one of the output target printers in the current print process and a member printer not designated with a corresponding check box is temporarily removed in the current print process from the output target printers; and a setting step of setting a member printer as a conflict target used for checking conflicts with respect to print settings to be used in the current print process set by the user, wherein the one member printer removed in said secondary registration step using the check box is displayed as one of the output target printers on the user interface in a next print process without re-registration by said primary registration step, wherein status information and device information of each of the member printers are displayed in the user interface, and a temporary error status of the member printer can be recognized in the status information and a print ability of the member printer including at least a stapling function can be recognized in the device information, wherein, if said selection step selects the ratio distribution print, the user interface allows setting of a distribution ratio for each member printer and said setting step sets all the member printers displayed on the user interface as conflict targets, and wherein, if said selection step selects the automatic substitute print, the user interface allows setting of a priority for each member printer and said setting step sets the member printer with the highest priority as a conflict target.

* * * * *